United States Patent
Grabau et al.

(10) Patent No.: US 12,486,824 B2
(45) Date of Patent: Dec. 2, 2025

(54) WIND FARM SYSTEM COMPRISING IMPROVED WIND GUIDE CONFIGURATION

(71) Applicant: Winnowave SL, Madrid (ES)

(72) Inventors: Peter Grabau, Kolding (DK); Manuel Agustín Alcocer Ramón-Laca, Madrid (ES)

(73) Assignee: Winnowave SL, Madrid (ES)

( * ) Notice: Subject to any disclaimer, the term of this patent is extended or adjusted under 35 U.S.C. 154(b) by 128 days.

(21) Appl. No.: 18/570,743

(22) PCT Filed: Jun. 14, 2022

(86) PCT No.: PCT/EP2022/066237
§ 371 (c)(1),
(2) Date: Dec. 15, 2023

(87) PCT Pub. No.: WO2022/263478
PCT Pub. Date: Dec. 22, 2022

(65) Prior Publication Data
US 2024/0392742 A1    Nov. 28, 2024

(30) Foreign Application Priority Data
Jun. 15, 2021 (DK) .................................. 202100637

(51) Int. Cl.
*F03D 1/04* (2006.01)
*F03D 9/00* (2016.01)

(52) U.S. Cl.
CPC ............. *F03D 1/046* (2023.08); *F03D 9/007* (2013.01); *F05B 2220/708* (2013.01)

(58) Field of Classification Search
CPC . F03D 1/04; F03D 1/046; F03D 7/048; F03D 9/257; F03D 17/007
See application file for complete search history.

(56) References Cited

U.S. PATENT DOCUMENTS

| | | | |
|---|---|---|---|
| 7,994,652 B2 * | 8/2011 | Grabau | F03D 1/04 290/55 |
| 8,251,638 B2 * | 8/2012 | Boyd | F03D 1/04 415/908 |

(Continued)

FOREIGN PATENT DOCUMENTS

| | | | | |
|---|---|---|---|---|
| CN | 108204330 A | | 6/2018 | |
| CN | 109185041 A | * | 1/2019 | ............... F03D 1/04 |

(Continued)

OTHER PUBLICATIONS

"New York Wind Energy Guide for Local Decision Makers: Wind Energy Basics", NYSERDA, Jun. 2017 (Year: 2017).*

(Continued)

*Primary Examiner* — Christopher R Legendre
(74) *Attorney, Agent, or Firm* — J. Peter Paredes; Amin Wasserman Gurnani LLP

(57) ABSTRACT

A wind farm system and a method to improve the energy production from a wind farm comprising one or more wind guides for speeding up the wind through the wind turbine rotor and thereby improving the energy production from the wind turbine. One wind guide covering several wind turbines or several wind guides with a limited gap between them have been proven to significantly improve the efficiency of wind guides. One or more wind guides covering the wind turbines in the last row of a wind farm has likewise shown unexpected significant improvements. CFD calculations have shown more than 40% improvement in generated power from a wind farm system in some cases.

5 Claims, 9 Drawing Sheets

(56) References Cited

U.S. PATENT DOCUMENTS

| | | | |
|---|---|---|---|
| 9,026,258 B2* | 5/2015 | Stapelfeldt | F03D 7/047 700/287 |
| 11,156,202 B2* | 10/2021 | Navarro | F03D 1/04 |
| 2002/0114692 A1 | 8/2002 | Boughton | |
| 2009/0297332 A1 | 12/2009 | Boyd | |
| 2012/0086214 A1 | 4/2012 | Roskey et al. | |
| 2014/0112777 A1* | 4/2014 | Kalra | F03D 7/048 416/120 |
| 2020/0300213 A1 | 9/2020 | Navarro | |
| 2024/0301858 A1* | 9/2024 | Grabau | F03D 1/04 |
| 2024/0392742 A1* | 11/2024 | Grabau | F03D 1/04 |

FOREIGN PATENT DOCUMENTS

| | | | | |
|---|---|---|---|---|
| CN | 109322783 A | * | 2/2019 | F03D 1/04 |
| JP | H11270455 A | | 10/1999 | |
| KR | 20090112358 A | * | 10/2009 | F03D 1/00 |
| KR | 20100026902 A | * | 3/2010 | H02S 20/32 |
| WO | 2007068256 A1 | | 6/2007 | |
| WO | 2016166385 A1 | | 10/2016 | |
| WO | 2019081563 A1 | | 5/2019 | |
| WO | WO-2020216965 A1 | * | 10/2020 | F03D 1/04 |

OTHER PUBLICATIONS

"How far apart should wind turbines be placed", https://www.ideasmedioambientales.com/en/blog/wind-turbine-spacing, May 18, 2021 (Year: 2021).*

Lerch, Markus et al. "A metaheuristic optimization model for the inter-array layout planning of floating offshore wind farms", International Journal of Electrical Power and Energy Systems, May 6, 2021 (Year: 2021).*

WIPO/ISA/EPO, International Search Report and Written Opinion issued in corresponding International Application No. PCT/EP2022/066237 on Sep. 23, 2022, 15 pages.

Danish Patent and Trademark Office, 1st technical examination report issued in corresponding Danish Appl. PA202100637 dated Sep. 15, 2021, 10 pages.

* cited by examiner

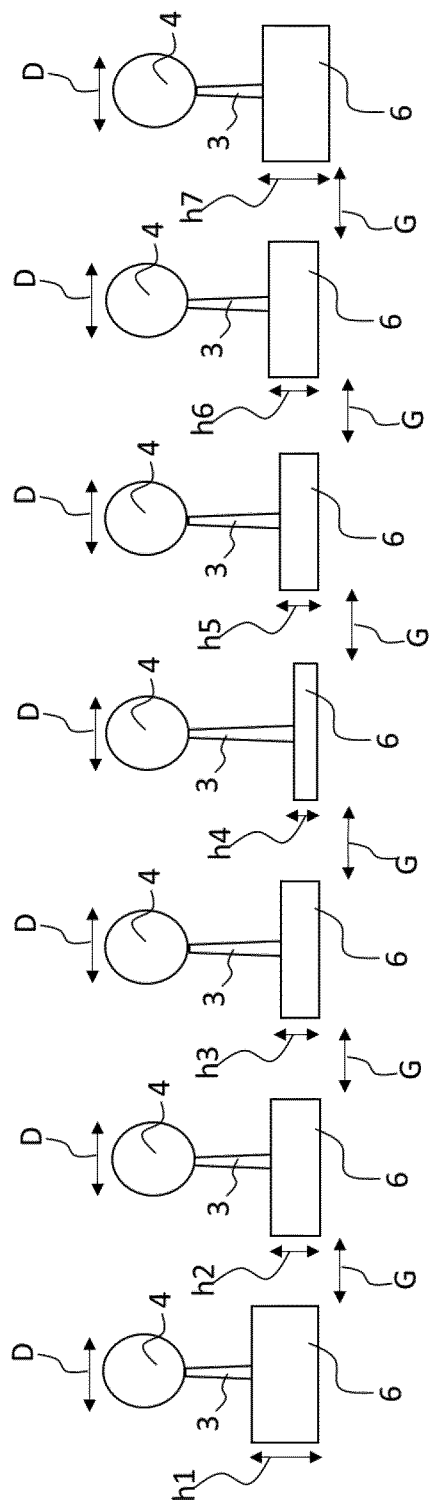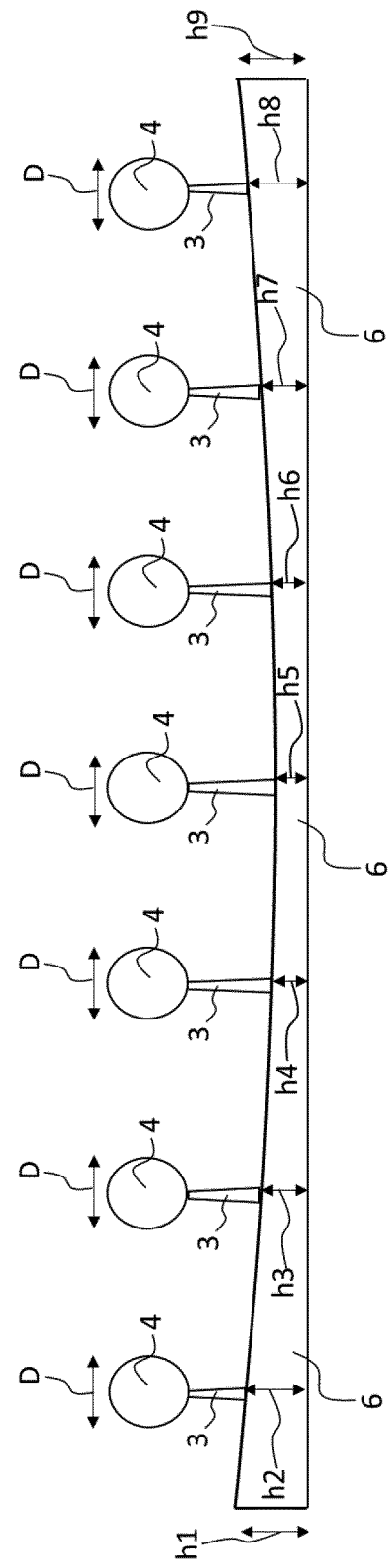

WIND FARM SYSTEM COMPRISING IMPROVED WIND GUIDE CONFIGURATION

CROSS-REFERENCE TO RELATED APPLICATIONS

The present application claims priority to PCT application serial no. PCT/EP2022/066237 filed Jun. 14, 2022, which claims priority to Danish patent application serial no. PA202100637 filed Jun. 15, 2021, each herein incorporated by reference in their entireties.

INTRODUCTION

The present invention relates to wind energy. The applicant discloses how multi-turbine wind farms comprising two, three or more wind turbines can increase considerably their production efficiency by installing structures (wind guides) that increase the wind flow through the wind turbines' rotors, differentiating with the prior art by exploiting the interaction and influence between the different elements of the wind farm system (wind guides and wind turbines) through specific configurations (relative location and shapes) of such elements.

The applicant has already disclosed prior to this application technological realizations that consider the installation of stand-alone structures (wind guides) next to stand-alone wind turbines to improve their stand-alone production efficiency by optimizing the wind flow conditions through the rotor of such stand-alone wind turbine (see prior art section).

However, when analysing two or more wind guides in front of at least two contiguous wind turbines forming a row and constructing the wind guides considering certain specific parameters, a new and not obvious effect appears, as assessed through advanced CFD tools that are calibrated with real experimental measurement data and will be explained in further details throughout this invention disclosure.

Considering a stand-alone wind guide in front of a stand-alone wind turbine two linked aerodynamic losses are predominant. Firstly, the wind flow that escape around the edges of the wind guide result in reduced efficiency of the wind guide to speed-up the wind at the wind turbine rotor. Secondly, the wind flow approaching the wind turbine rotor, after leaving the wind guide, will increasingly diverge away from the wind turbine rotor swept area as the wind flow approaches the wind turbine rotor (as shown in FIGS. 6, 7 and 14), also resulting in aerodynamic losses that reduce the average increase in wind speed through the rotor of the wind turbine caused by the presence of the wind guide.

To reduce such aerodynamic losses, increasing the horizontal length of the wind guide is an option. However, in a stand-alone configuration, a cost-benefit analysis of the increase in horizontal length of the wind guide in order to increasing the average wind speed through the wind turbine's rotor caused by the increase in horizontal length of the wind guide, will most often show the result that the extra energy gained by the increased wind guide horizontal length, will result in a higher cost-of-energy than in an optimal case where the wind guide typically has a horizontal length of 1.2 to 1.6 times the length of the wind turbine's rotor diameter.

When considering two contiguous wind guides where their closest ends are located closer than the distance equivalent to the lengths of the two contiguous wind turbine rotor diameters, the narrowing of the gap between such contiguous wind guides results in a wind flow that is diverging considerably less away from the wind turbine's rotor swept area and considerably less wind flow will escape at the ends of the independent wind guides which in turn will result in less aerodynamic losses and higher wind speed increases through the wind turbine rotors swept areas. These differences are shown in FIGS. 14 and 15.

In the present invention disclosure, another embodiment of the invention is disclosed, where eliminating partially some of the aerodynamic losses at the ends of wind guides by introducing continuous wind guides that will improve the wind speed increase for at least two contiguous wind turbines, as opposed to the above-described embodiment, where independent wind guides improve the wind speed of independent wind turbines. This continuous wind guide concept has shown to also have an impressive effect.

As an example, 3-dimensional CFD (Computational Fluid Dynamics) calculations for a certain case with a 3-Megawatt wind turbine with a 90-meter-long rotor diameter and 80-meter hub height and a wind guide with 16 meters vertical height and 165-meter horizontal length in front of it, has shown that considering a stand-alone wind guide next to a stand-alone wind turbine, the energy produced by the wind turbine increases 1298 MWh/year. Considering a continuous wind guide as disclosed in the present invention disclosure, it was found that the energy produced by the wind turbine will increase to 3771 MWh/year, which is almost 3 times more than for the stand-alone wind turbine case, and the equivalent to more than 35% increase of the energy production obtained by the wind turbine. This is achieved without increasing the cost-of-energy which was the case when increasing the horizontal length of the wind guide in front of one stand-alone wind turbine. When designing a new wind farm lay-out together with a new wind guide lay-out as disclosed in the present invention disclosure, the increase in energy production can be achieved at roughly the same wind guide cost as for an already known stand-alone wind guide solution (as described below in the prior art section) at a stand-alone wind turbine. Therefore, the cost-of-energy of the renewable energy generated from wind turbines as described in this invention disclosure is reduced significantly.

The present invention discloses systems and methods to improve the energy extraction and/or reduce the cost of a wind farm system where the wind turbines and/or wind guides, are substantially aligned forming a row and comply with the conditions to reduce aerodynamic losses as described above. It is possible to obtain such improvement by adjusting the relative position of the wind turbines and the wind guide(s) within the row and/or the height of the wind turbine and/or the height of the wind guide(s), depending on their relative position within the row. Research through advanced CFD simulations have indicated that when having a wind farm system forming a row of wind turbines and/or a row of wind guides, due to the different wake formations at different relative positions of wind turbines within the row, the cost-of-energy from the wind farm system can be optimized when the distance between the lower blade tip position of the wind turbine rotors and its closest wind guide's top edge increases when approaching the wind turbines in the centre of the row (i.e.: or decreases when approaching the ends of the row). This relative position of the lower blade tip of the wind turbine relative to the position of the wind guide can be adjusted either by adjusting the distance of the wind turbine in relation to the wind guide and/or by adjusting the hub height of the wind turbine and/or by adjusting the height of the wind guide.

The present invention also discloses systems and methods to exploit wind guides to improve the energy extraction by more than 40% for the last row of wind turbines in a wind farm and/or to reduce the distance between the last row and the second last row and thereby to reduce the land needed for the wind farm and/or to install more wind turbines at the same piece of land.

The present invention disclosure describes in more details the realizations and methods that are necessary to achieve the above-described technical advantageous effects.

PRIOR ART

Patent application US2020/0300213 A1 by Sonsoles Navarro presents a wind guide for speeding up the wind at a wind turbine and thereby increase the energy production from the wind turbine. FIG. 12B shows a wind farm with 16 wind turbines with wind guide in front of each of them. In the description is written: "FIG. 12B illustrates a top view of a portion of a wind farm 70 comprising a plurality of wind turbines 40. A wind guide 2 is arranged in front of every wind turbine 40 in order to increase to efficiency of the wind park 70 by reducing the wake effect as explained with reference to FIG. 1A". This is different from the present invention in several aspects. The present invention is not related to reducing the wake effect from neighbouring wind turbines. The present invention is related to improving the efficiency of the wind guides by reducing the aerodynamic losses caused by the wind escaping around the wind guide ends and by forcing the flow in front of the wind turbine rotor to be more two dimensional to avoid the aerodynamic losses caused by the divergence of the wind flow in front of the wind turbine rotor. These effects are, according to the present invention, achieved by designing the wind farm system so that the horizontal gap between the two closest ends of two contiguous wind guides is less than the sum of the length of the rotor diameters of the two wind turbines positioned closest to the two contiguous wind guides. Moreover, in FIG. 12B in US2020/0300213 A1, the above-mentioned gap seems to be many times more than 2 rotor diameters, and therefore the effects achieved by the present invention, will not be achieved with such a wind farm layout as described in US2020/0300213 A1.

OBJECT OF THE INVENTION

It is therefore an object of the present invention to provide wind farm systems and methods to improve the energy production from wind farms significantly by including a new and better configuration of wind guides for speeding up the wind for at least some of the wind turbines in the wind farm.

It is another object of the present invention to provide a system and a method to reduce the levelized cost of energy from present and future wind farms.

It is another object of the present invention to provide a system and a method to reduce the total cost of new wind farms with wind guides by reducing the distance between the wind turbines, which will in turn reduce the land use and/or increase the total power capacity of the wind farm within the available land.

It is another object of the present invention to provide a system and a method to, in some cases, improve the energy production only from the last row of wind turbines in a wind farm with several wind turbine rows.

It is another object of the present invention to provide a system and a method to widen the potential wind farm locations to include locations with lower annual mean wind speed and still show a good business case.

It is another object of the present invention to provide a system and a method to combine a more efficient wind guide set-up with means to improve the visual impact of the wind guide and of the wind farm in general.

It is another object of the present invention to provide a system and a method to further exploit the presence of the improved wind guide set-up to support solar panels and thereby decrease the costs of hybrid wind-solar power.

It is another object of the present invention to provide a system and a method to design more efficient future wind farms so that they produce more energy and possibly have more power capacity.

It is the ultimate object of the present invention to provide a system and a method to generate cost-efficient clean energy and help decrease carbon dioxide emissions, decarbonize human economic and industrial activities, fight against climate change and make a more sustainable world.

At least one of the above objects, which will be evident from the below description of the present invention, is according to a first aspect of the present invention achieved by a wind farm system as defined by the claims.

DESCRIPTION OF THE INVENTION

In a first aspect of this invention disclosure a wind farm system and a method to increase the energy production from a wind farm system is disclosed. The wind farm system comprising at least two or at least three contiguous wind turbines forming at least one row of wind turbines. The row(s) are substantially perpendicular to the predominant wind direction. The wind turbine system comprises wind guides for at least some of the wind turbines for blocking and thereby guiding the wind in front of the wind turbines. The wind turbines each comprising a tower and a rotor provided with a number of rotor blades defining a rotor swept area when the rotor is rotating. The wind guides are ground-based, seabed-based or floating in the sea surface and at least one of the wind guides have a horizontal length and a vertical height that is defining an area that is standing substantially vertically within a range of +/−10 degrees. The wind guides are substantially arranged and configured so they face the wind substantially in the predominant wind direction. Each of the wind guides are defining a horizontal length between its two lateral ends that is not lower than 1 time the length of the closest wind turbine rotor diameter. Each of the wind guides are also defining a vertical height that is constant or variable along the horizontal length of the wind guide but not lower than 3 meters and not higher than two thirds of the height from the ground to the closest wind turbine blade tip when the blade is positioned at its lowermost position. Each of the wind guides are also defining a horizontal width that is constant or variable along the horizontal length of the wind guides but always lower than 1.5 times the height of the wind guides. Each of the wind guides are substantially arranged and configured to block and thereby guide the wind at an altitude below the rotor swept area so the wind behind the wind guides has another direction and speed than the wind in front of the wind guides. Each of the wind guides are substantially arranged and configured to direct the wind to an area in front of and/or behind the wind turbine rotor swept areas so that through the wind turbine rotor swept areas the wind speed is increased. Substantially between each of the wind guides a gap may be present, referred to as a horizontal gap. The horizontal gap between the two closest ends of two contiguous wind guides is less than the sum of the lengths of the rotor diameters of the two wind turbines positioned closest to the two contiguous wind guides.

The wind guide function with a wind blocking effect to generate a high-pressure area in front of the wind guide. Since the wind flows from high pressure areas to lower pressure areas a substantial part of the wind approaching the wind guide will move upwardly towards the wind turbine rotor swept area as intended. CFD calculations have shown this effect to be much more efficient than for a wind guide positioned at an angle designed to lead the wind upwardly. Actually, a 45-degree relative to horizontal angled wind guide was found to have practically no effect on increasing the wind speed through the wind turbine rotor swept area.

As explained in the introduction, the narrowing of the gap between the contiguous wind guides result in a flow configuration that result in less flow divergence and aerodynamic losses towards the end of the wind guides, which result in higher average wind speed increase through the wind turbine rotors swept areas and consequently a better power performance from the wind turbines.

The extreme case of this realization is when the horizontal gap between two contiguous wind guides is zero. In this case CFD calculations have likewise shown that the wind speed increase through the two, three or more contiguous wind turbines' rotor swept areas is significantly higher than for the stand-alone wind guide with a stand-alone wind turbine, or in case the independent and contiguous wind guides are separated by some gap between their closest ends. The case with one wind guide that influence at least two or three contiguous wind turbines is also a preferred embodiment of the present invention, which is almost equivalent to the first embodiment with gap between extremes equal to zero, except for constructive implications of having only one wind guide instead of two independent wind guides.

However, not always can a wind guide be extended to form one continuous wind guide and influence two, three or more contiguous wind turbines, due potentially to the specific orography and obstacles in the site, and/or to allow the convenient circulation of people, cattle, wild animals or agricultural services around wind guides.

The present invention is limited to gaps between contiguous ends of wind guides ranging from zero to a length equivalent to the sum of the length of the two contiguous wind turbine rotor diameters because CFD calculations have shown a good improvement ion efficiency of the wind guides for this gap interval.

For all CFD simulations and calculations throughout this invention disclosure the main dimensions described above and following inputs were used in the set-up of the Ansys CFD tool. A standard k-epsilon turbulence model has been used. Nevertheless, turbulence parameters have been set to those presented by Alinot & Masson, which are often used in the wind power industry and of well-proven reliability for neutral atmospheric boundary layer CFD modelling. To achieve streamwise stability in terms of wind speed and turbulence kinetic energy, the source terms approach presented by Richards & Hoxey has been implemented. These are used to account for the interaction of the flow with the ground and the top free stream above the simulated domain and thereby to avoid undesired streamwise turbulence and momentum dissipation.

To set up the domain, apart from the above stated turbulence and sources set up, boundary conditions for lateral faces have been set as symmetry planes to be able to consider a large array of wind turbines with a considerable calculation resource saving. Bottom face is a rough wall according to standard sand grain roughness with an aerodynamic roughness length of 0.0025 meters. Inlet wind speed profile, turbulence kinetic energy and turbulent kinetic dissipation rate have been set also as suggested Richards & Hoxey. In the case of wind speed profile, a profile according to the already said roughness would correspond to a 0.1 wind shear exponent in the power law vertical wind profile.

The limitation of the horizontal gap size in this patent disclosure is that the horizontal gap between the two closest ends of two contiguous wind guides is less than the sum of the length of the rotor diameters of the two wind turbines positioned closest to the two contiguous wind guides. For a single wind turbine, the increase in wind power output was calculated to be 16%. For the sum of the length of the two identical rotor diameters a gap at 2.1 rotor diameters resulted in an increase in power output at 17% and for exactly the limitation of this invention disclosure at 2.0 rotor diameters the increase in power output was found to be 19% and for no gap at all and an exceptionally large number of wind turbines in a row, the result was an increase in power output at 43%. Therefore, for a set-up as used in these CFD calculations and with the input dimensions as described in this invention disclosure, the expected improvement in power production is between 16 and 43%, where the 16% describe the single wind turbine and therefore the present state of the art.

As described above, the horizontal gap between the two closest ends of two contiguous wind guides should be less than the sum of the length of the rotor diameters of the two wind turbines positioned closest to the two contiguous wind guides. The smaller the gap is the higher the extra power output from the wind turbines will be, so alternatively the horizontal gap between the two closest ends of two contiguous wind guides may also be less than 0.95, 0.9, 0.85, 0.80, 0.75, 0.70, 0.65, 0.60, 0.55, 0.50, 0.45, 0.40, 0.35, 0.30, 0.25, 0.20, 0.15, 0.10, 0.05 times the sum of the length of the two rotor diameters of the two wind turbines positioned closest to the two contiguous wind guides In new wind farms on sites with a predominant wind direction sector, the wind turbines may be positioned relatively close to each other. Installing a continuous wind guide will cost-efficiently exploit the benefits of the present invention as the length of the continuous wind guide will be shorter and thus, its costs will be reduced.

Additionally, when applying one long continuous wind guide to several wind turbines, the efficiency of the wind guide will be higher at a larger interval of wind directions. This has also been proven with advanced CFD calculations calibrated with real experimental data. Also, it may in many cases be beneficial to design the wind guide from steel profiles like for example steel sheet piles which are relatively economical and easy to install in many soil types. A lean structure like a steel sheet pile structure may be prone to vibrating in the wind during certain wind conditions. These vibrations are much less likely to appear on an exceptionally long structure, and in case the vibrations are somehow initiated anyways, the entire structure may be designed so that the sliding in the interlockings helps dampening the vibrations.

CFD calculations have likewise shown an importance of the number of wind turbines with wind guides within a row of wind turbines. For example, a 90-meter rotor wind turbine with hub height at 80 meters and a wind guide with a vertical height at 16 meters and a horizontal length at 165 meters, the increase in power output from the wind turbine was found to be 16% when applying a vertical wind profile with a wind shear exponent of 0.1. For the same wind turbine, same wind guide height and same wind shear but with 20 units of the 90-meter rotor wind turbines positioned with a distance of 165 meters and with a continuous wind guide at 3.3 km, the increase in power output from the turbines was found to be 43% for the two wind turbines in the middle. This is an incredibly significant finding, since the total length and assumably also the total cost of wind guides for the 20 wind turbines would be roughly the same in the two cases, whereas the increase in power output from the wind turbines was found to be more than double, at least for the most central wind turbines. By analysing the results from the CFD calculations two main aerodynamic phenomena were found to be the most important to explain this result. Firstly, the wind guide at the single wind turbine has a certain length which in this case is 1.83 times the length of the wind turbine rotor diameter, and a certain amount of wind will escape around the sides of the wind guide. This aerodynamic loss could, in theory, be avoided by extending the length of the wind guide to infinity and with a 3.3-kilometre-long wind guide the result will be, from an aerodynamic point of view, close to the result from an infinitely long wind guide when only considering the two wind turbines in the middle of the row. Secondly, the wind guide is usually positioned at a predefined distance in front of the wind turbine, in this case 80 meter (representing a case where the speed-up of the wind is primarily in front of the wind turbine rotor) and therefore the wind flow above the wind guide between the wind guide and the wind turbine rotor is speeded up over a horizontal distance at 80 meters. As this wind flow is approaching the wind turbine rotor, it will diverge substantially to the sides and thereby a certain amount of wind is escaping and wasted, since it is substantially escaping around the periphery of the swept area of the rotor of the wind turbine. Both two aerodynamic phenomena are at least partly improved by the present invention.

Preferably the wind guide should cover the area all the way from the ground or sea surface with no major leakage between the bottom part of the wind guide and the ground or sea surface. CFD calculations have shown a significant reduction in wind guide efficiency when the open area at the bottom part of the wind guide is just 5-10% of the vertical height of the wind guide. This is because the high pressure at area in front of the wind guide is significantly reduced.

Preferably the horizontal length of the wind guide is higher than the closest wind turbine rotor diameter. CFD calculations have shown good efficiencies when the wind guide horizontal length is between 1.2 and 1.6 times the wind turbine rotor diameter. This is for a single wind turbine with a single wind guide. CFD calculations have also shown that the increase in wind speed through the wind turbine rotor swept area is roughly proportional to the vertical height of the wind guide. Therefore, a limitation to the vertical height of the wind guide to 3 meters has been stated, although lower heights will also have a positive effect on increasing the wind speed through the wind turbine rotor swept area. The 3 meters limitation is mainly chosen for practical reasons, since it is not seen to be realistic to achieve a good business case with lower wind guides. The horizontal width of the wind guide has been limited to be lower than 1.5 times the vertical height of the wind guides. The wind guide may be constructed in many ways using many different materials. One option is steel sheet piles interlocked to each other's and piled partly into the ground to form a wind guide. Another option is a king post wall structure comprising ground based or seabed based HEB steel profiles as overall load carrying structure and with infill sheets of any kind between the king posts (the HEB profiles) to form a low porosity wall structure being the wind guide. Another option is to stack straw bales like the modern ones also known as big bales weighing up to 500 kg each and being substantially shaped as a box. These straw bale stacks already exist in many cases on fields for storage. A straw bale wind guide may have roughly the same vertical height as the horizontal width but rarely exceed the 1.5 times limit as described above. The wind guide may also be partly designed with flexible sheet materials like a tarpaulin resulting in a much lower horizontal width to vertical height ratio than the 1.5 ratio as described above. Wind guides made from shipping containers is another example that substantially will be within the 1.5 ratio limit as described above. Finally, CFD calculations have shown a good aerodynamic effect of wind guides within the 1.5 ratio limit, and it was found that when the 1.5 ratio was exceeded at the top part of the wind guide, the efficiency of the wind guide was decreasing.

In a preferred embodiment of the invention, at least one of the wind guides is positioned at a distance from the wind turbine and at least one of the wind guides has no physical contact with the wind turbine. The distance may be more than 0.1, 0.2, 0.3, 0.4, 0.5, 0.6, 0.7, 0.8, 0.9, 1.0, 1.1, 1.2, 1.3, 1.4, or 1.5 times the rotor diameter of the wind turbine closest to the wind guide. CFD calculations have shown best efficiencies of the wind guide to increasing the average wind speed in front of the wind turbine rotor swept area when the distance is a bit less than the rotor diameter. This is for a flat area wind farm and the distance will differ according to topography and availability of land. Other factors may also influence the final choice of distance between the wind turbine and the wind guide. Fire hazards required distances is an example. For a straw bale wind guide the safety distance to the wind turbine is required to be more than 100 meters due to fire regulations in Denmark as an example. In some cases, it may be of interest to speed up the wind primarily behind the wind turbine and in those cases the distance will be at the lower ranges or even aligned with the row of wind turbines.

In a preferred embodiment of the invention, throughout at least one of the swept areas of the wind turbine rotors the vertical wind shear is reduced and/or the turbulence intensity is reduced so that the fatigue loads onto the wind turbine rotor blades are reduced. The wind shear just in front of the wind turbine rotor swept area is a major contributor to fatigue loadings onto the blades and thereby the entire wind turbine structure. The wind shear is often described with a logarithmic or an exponential formula describing how the wind speed changes as we move upwardly in the atmospheric boundary layer. In flat areas the wind shear is almost always positive meaning that the wind speed increases as we move upwardly. CFD calculations have shown that a positive wind shear exponent at 0.1 in the free stream in front of the wind turbine rotor swept area will change to 0.05 after installing a vertical oriented wind guide. This is due to the fact, that the wind guide primarily increases the wind speed in the lower part of the wind turbine rotor swept area and it increases the wind speed less in the upper part. In principle the wind guide will generate a slightly negative wind shear that, when added to the original positive wind shear, results in a reduction in wind shear and thereby the cyclic fatigue loads onto the wind turbine blades. Same CFD calculations have shown a reduction in turbulence intensity which is mainly due to the increase in wind speed combined with avoiding adding any more turbulence to the flow. The turbulence may be roughly the same with and without the wind guide, but since the wind speed is increases, the turbulence intensity is reduced. Also, a reduction in turbulence intensity will decrease fatigue loads when comparing fatigue loads at the same wind speed through the wind turbine rotor swept area. So, the fatigue damage per generated kilo Watt hour by the wind turbine is reduced.

In a preferred embodiment of the invention, the distance between any of the contiguous wind turbines' towers in the wind farm system is more than 1.0 and less than 1.1, 1.2, 1.3, 1.4, 1.5, 2, 2.5, 3, 3.5, 4, 4.5, 5, 5.5, 6, 6.5, 7, 7.5, 8, 8.5, 9, 9.5 or 10 wind turbine rotor diameters and in a similar alternative preferred embodiment of the invention, the wind farm system comprises wind turbines where the distance between at least two of the wind turbines in the wind farm system is less than 1.1, 1.5, 2, 2.5, 3, 3.5, 4, 4.5, 5, 5.5, 6, 6.5, 7, 7.5, 8, 8.5, 9, 9.5 or 10 times the length of the wind turbine rotor diameters. In today's single row wind farms with a strong predominant wind direction the distance between wind turbines is often about two rotor diameters. In the rare cases when the wind direction is substantially parallel to the row of wind turbines, the wind turbines will most likely shut down to avoid that the wind turbines are operate in the strong wake produced by the wind turbines in front of them when considering the actual wind direction. As the predominance in the wind direction decreases, the distance between individual wind turbines tends to increase to improve the park efficiency as the wind turbines will experience wake flow from neighbouring wind turbines more and more often. The present invention is most efficient with the continuous wind guide covering more than one or two wind turbines. To limit the costs of the wind guide, a small distance between wind turbines will often be the best solution. On the other hand, for existing wind farms with relatively large distance between the wind turbines, the present invention may also be beneficial in many cases.

In a preferred embodiment of the invention, the wind farm system comprises at least two rows of wind turbines, such rows being substantially perpendicular to the predominant wind direction and located substantially one row behind the other row considering the predominant wind direction. The wind guides are located only at the last of the at least two rows of wind turbines in the wind farm system. The last row is located substantially downwind to the other row(s) of wind turbines in the wind farm system. In a similar preferred embodiment of the invention, the wind farm system comprises at least two rows of wind turbines substantially parallel to each other and located substantially one behind the other, preferably but not necessarily, considering the predominant wind direction sector, where the wind guides are located only at the last row of wind turbines in the wind farm system being such row located downwind to the other rows of wind turbines in the wind farm, preferably but not necessarily, considering the predominant wind direction sector. CFD calculations of multi-row wind farms have shown surprisingly good results when wind guides are positioned in front of the wind turbines in the last row so the wind will be influenced by one or more wind turbines before it reaches the wind turbines with the wind guide(s) in the last row. Especially when one or two wind turbine rows are positioned in front of the last row wind turbines with wind guides, the effect is surprisingly good. CFD calculations have shown that the speed-up of the wind around the wind turbine rotors bottom part in the front row(s), caused by the induction that is caused by the operating wind turbines extracting energy from the wind in the front row(s), is the main reason for the higher speed-up by the wind guide located in the last row. The wind guide simply experiences higher wind speed in front of them, caused by the induction from wind turbines located upwind. In a preferred solution of the invention this front wind turbine induced speed-up effect is combined with the effect originating from a wind guide design and positioning according to the first aspect of this invention, where the horizontal gap between the two closest ends of two contiguous wind guides is less than the sum of the length of the rotor diameters of the two wind turbines positioned closest to the two contiguous wind guides. The extreme case when the horizontal gap is zero, which is aerodynamically equivalent to the continuous wind guide, is also a preferred solution when combined with its location at the last row of a multi-row turbine array.

In a preferred embodiment of the invention, the average distance between the row of wind turbines with the wind guides and the row of wind turbines positioned upwind considering the predominant wind direction is at least 10% or 20% or 30% or 40% or 50% or 60% or 70% or 80% lower than the lowest distance between any other consecutive row in the wind farm system. Thereby a significantly reduction in the land area needed for the wind farm system is achieved. In traditional wind farm layout design the distance between rows are often determined by the rate of recovery of the wakes and thereby optimize the entire wind farm efficiency to achieve lowes possible cost of energy. In a relatively flat area this optimization often ends up in distances between wind turbines at 5 to 10 rotor diameters. The function of a wind turbine can be explained by the Betz's Law where the presence of the wind turbine results in a reduction in wind speed at $2/3$ relative the free wind speed. This reduction in wind speed in the wake just behind the rotor swept area is found to also influence the wind speed below and the rotor swept area. Since the wind turbine partly block the wind, some of the wind will try to escape outside around the rotor swept area. Therefore, when installing a wind guide at the last row, the turbines in front of the wind guide will already have increased the wind speed just in front of the wind guide resulting in a better effect of the wind guide. This effect is found more than counteracting the better park efficiency with more distance between the wind turbines, and therefore the last row with wind guide(s) can be installed much closer to the row in front of it than in traditional cases where no wind guides are used. Exactly how much the distance between the two rows can be reduced will depend on site conditions, wind turbine sizes and maximum power outputs, wind guide configuration, and the wind conditions on site.

In a preferred embodiment of the invention, the wind farm system comprises only one row of wind turbines with one or more wind guides. On sites with a very strong predominant wind direction the wind farm often only comprises one row of wind turbines and those turbines are often situated close to each other's. Distances between 1.3 and 2 rotor diameters are common in those wind farms. Therefore, the preferred embodiment is for those wind farms since both the wind direction predominance and the small distance between the wind turbines is advantageous, primarily due to the limited needed horizontal length of the wind guide(s). In case each wind turbine has one separate wind guide it will also be advantageous, since the wind guide efficiency increase as soon as the horizontal gap between the two closest ends of two contiguous wind guides is less than the sum of the lengths of the rotor diameters of the two wind turbines positioned closest to the two contiguous wind guides.

In a preferred embodiment of the invention, the horizontal gap between the two closest ends of two contiguous wind guides is substantially zero meters forming a substantially or at least partly continuous wind guide for more than one wind turbine. In another similar preferred embodiment of the invention, the wind farm system comprises one wind guide located in front of at least two contiguous wind turbines. As explained before, the wind guides reduce substantially their aerodynamic losses primarily due to the divergence of the wind flow and the escape of the wind at the ends of the wind guide when compared to the case where one stand-alone wind guide is located at one stand-alone wind turbine.

In a preferred embodiment of the invention, the wind farm system comprises at least 3, 4, 5, 7, 10, 15, 20, 25, 30, 35, 40, 45, 50, 55, 60, 65, 70, 75, 80, 85, 90, 95, 100, 120, 140, 160, 180, 200, 250, 300 wind turbines in each row. The two main aerodynamic phenomena causing the more efficient wind guide according to the present invention, is, as described above, to reduce the wind flow escaping at the ends of the wind guide and the reduced divergence of the wind flow in the area between the wind guide and the wind turbine rotor. Both aerodynamic loss phenomena will improve as the wind guide length is extended and it covers more and more wind turbines. The absolute optimum would be achieved in an infinite long row of wind turbines, resulting in a totally two-dimensional flow with no aerodynamic losses caused by previously described aerodynamic phenomena. This is not achievable in practice but with an exceptionally large number of wind turbines in one row and with one very long wind guide, the CFD results are very close to the two-dimensional CFD results. CFD results further showed that, for at least 10 wind turbines in one row with one continuous wind guide, the efficiency is quite close to the maximum possible and therefore at least 10 wind turbines with a continuous wind guide are an extra advantageous preferred configuration.

In a preferred embodiment of the invention, the wind farm system comprises at least two wind guides with substantially different vertical heights so that the vertical height is highest closest to the ends of the row of wind turbines and the vertical height is lowest closest to the centre of the row of wind turbines. In a similar preferred embodiment of the invention, the wind farm system comprises wind guide(s) with different vertical height(s). Preferably these wind guide height(s) depend on its relative position in a row of the wind turbines, and preferably having less height(s) in the wind guide(s) closest to the wind turbines located in the centre of the row than the height of the wind guide(s) closest to the wind turbines located near the two ends of the row. Preferably, the wind farm system comprises at least 3 wind turbines and discrete wind guides, and the height of the wind guides is adjusted to improve the cost of the wind farm system. In a wind farm system comprising at least 3 wind turbines which are substantially aligned to form a row and discrete wind guides that comply with the previously disclosed conditions to reduce aerodynamic losses, decreasing the height(s) of the wind guides in the centre will save material costs and the energy production from the wind turbines will not be severely reduced. Advanced CFD simulations have indicated that when having a set-up of wind turbines forming a row, the wind turbines will extract similar energy due to the increased wind speed thanks to the wind guides, if the distance between (a) the lower blade tip of the wind turbines closest to the centre of the row and (b) its closest wind guide(s) top edge(s) is higher than the distance between (a) the lower blade tip of the wind turbines closest to the ends of the row and (b) its closest wind guide(s) top edge(s). It is possible to adjust these distances by having shorter wind guides in the centre of the row and taller wind guides towards the ends of the row. The actual distances of the configuration will vary depending on the dimensional parameters of the specific wind turbines and wind guide(s) but what has been found, from research and analysis of the wake of the wind guides at the different locations within the row of wind turbines, is that the most optimal height for the wind guides of the wind turbines when approaching the centre of the row is lower than the optimal wind guide height(s) close to the ends of the row, as it is shown in FIG. 12.

Another embodiment of the invention is similar to the previous one but in this case, the wind farm system comprises at least 3 wind turbines and one continuous wind guide, and an adjustment of the height(s) of the wind guides to improve the cost of the wind farm system. In a wind farm system comprising at least 3 wind turbines which are substantially aligned to form a row and discrete wind guides that comply with the previously disclosed conditions to reduce aerodynamic losses, decreasing the height(s) of the wind guides in the centre will save material costs and the energy production from the wind turbines will not be severely reduced. Advanced CFD simulations have indicated that when having a set-up of wind turbines forming a row, the wind turbines will extract similar amounts of energy due to the increased wind speed caused by the wind guides, if the distance between (a) the lower blade tip of the wind turbines closest to the centre of the row and (b) its closest wind guide(s) top edge(s) is higher than the distance between (a) the lower blade tip of the wind turbines closest to the ends of the row and (b) its closest wind guide(s) top edge(s). Adjusting these distances so the wind guide is shorter in the centre of the row and taller towards the ends of the row is a good option. The actual distances of the configuration will vary depending on the dimensional parameters of the specific wind turbines and wind guide(s) but what has been found from research and analysis of the wake of the wind guides at the different locations within the row of wind turbines is that the most optimal height(s) of the wind guides of the wind turbines when approaching the centre of the row, is lower than for the wind guides close to the ends of the row, as it is shown in FIG. 13.

In a preferred embodiment of the invention, the wind farm system is configured so that the distance between the position of the lowest position of the wind turbine rotor blade tips of each wind turbine rotor and its closest wind guide's top edges is different depending on the wind turbines relative position in the row of wind turbines with one or more wind guides. In a similar preferred embodiment of the invention the distance between the lowest position of the wind turbine rotor blade tips of each wind turbine rotor and its closest wind guide's top edges is lower closer to the ends of the row of wind turbines with one or more wind guides and is higher closer to the centre of the row of wind turbines with one or more wind guides.

In other words, it is preferred to having a higher distance for the wind turbines located in the centre of the row than for the wind turbines located closer to the two ends of the row. The wind farm system comprising at least 3 wind turbines and wind guide(s) that are substantially aligned to form a row and complies with the previously disclosed conditions to reduce the aerodynamic losses. To optimize the energy extracted by the wind farm system, adjusting the relative location of such wind turbines vis-à-vis the wind guide(s) is a preferred solution. Advanced CFD simulations have indicated that when having a set-up of wind guides forming a row, more wind speed-up is achieved, when this above defined distance is higher for the wind turbines positioned close to the centre of the row, and the distance is smaller for wind turbines positioned closer to the ends of the row. The actual distances of the configuration will vary depending on the dimensional parameters of the specific wind turbines and wind guide(s) but research and analysis of the wakes behind the wind guides at the different locations within the row has shown that the most optimal location for the rotors of the wind turbines when approaching the centre of the row is further away from its closest wind guide than the wind turbines close to the ends of the row as it is indicated in FIGS. 8 and 9.

Another embodiment of the invention disclosure is similar to the previous one but in this case, the wind turbines positions are fixed and therefore adjusting the relative position of the wind guides will result in substantially the same optimum solution. In a wind farm system comprising at least 3 wind turbines substantially aligned to form a row and with discrete wind guides that comply with the previously described conditions to reduce aerodynamic losses, increasing the energy extracted from the wind farm system by adjusting the relative location of such wind guides vis-à-vis the wind turbines is preferable. Advanced CFD simulations have indicated that when having a set-up of wind turbines forming a row, the wind turbines will extract more energy due to the increased wind speed caused by the wind guides, if the distance between (a) the lower blade tip of the wind turbines closest to the centre of the row and (b) its closest wind guide(s) top edge(s) is higher than the distance between (a) the lower blade tip of the wind turbines closest to the ends of the row and (b) its closest wind guide(s) top edge(s). The actual distances of the configuration will vary depending on the dimensional parameters of the specific wind turbines and wind guide(s) but it has been found from research and analysis of the wake of the wind guides at the different locations within the row of wind turbines, that the most optimal location for the rotors of the wind turbines when approaching the centre of the row is further away from its closest wind guide, than the wind turbines close to the ends of the row as it is indicated in FIG. 10.

Another embodiment of the invention is similar to the previous one but in this case, the wind turbines positions are fixed, and the shape of a continuous wind guide is adjusted. In a wind farm system comprising at least 3 wind turbines which are substantially aligned to form a row and a continuous wind guide that complies with the previously disclosed conditions to reduce aerodynamic losses, it is preferable to increase the energy extracted by the wind farm system by adjusting the shape of the continuous wind guides. Advanced CFD simulations have indicated that when having a set-up of wind turbines forming a row, the wind turbines will extract more energy due to the increased wind speed caused by the continuous wind guide, if the continuous wind guide has an approximate arch-shape as indicated in FIG. 11, which is basically characterised by the fact that the distance between (a) the lower blade tip of the wind turbine rotors closest to the centre of the row and (b) the closest part of the continuous wind guides top edge is higher than the distance between (a) the lower blade tip of the wind turbines closest to the ends of the row and (b) its closest part of the continuous wind guide top edge. The actual parameters of the configuration will vary depending on the dimensional parameters of the specific wind turbines and wind guide(s) but what has been found from research and the analysis of the wake of the wind guides at the different locations within the row of wind turbines is that the most optimal location for the rotors of the wind turbines when approaching the centre of the row is further away from the closest part of the continuous wind guide than the wind turbines close to the ends of the row.

In a preferred embodiment of the invention, the horizontal gap between two contiguous wind guides or a horizontal gap inside a wind guide is located where a road, a river, or a path is located so that people, animals, vehicles, cranes, boats, ships, trucks, and any goods for road or river transport can pass through the gap. In case the access road to the wind turbine is located at or close to where the predominant wind direction is located upwind relative to the wind turbine, it may be necessary to have such a horizontal gap to free the access to the wind turbine. In case where a very long continuous wind guide is covering many wind turbines it is also likely that a road or a river or a path will be present where the wind guide is installed resulting in the necessity to have the horizontal gap. In case the wind guide block access between two fields it is also likewise needed to have a horizontal gap for the farmer and his machinery to go from one field to the other.

In a preferred embodiment of the invention, the horizontal gap between the two contiguous wind guides or a horizontal gap inside a wind guide comprises means to open and to close the horizontal gap either manually or automatically. In another embodiment of the invention, the horizontal gap between those two contiguous wind guides to avoid blocking such free access is covered with a detachable or withdrawable tarpaulin or any other flexible material to allow temporarily such free access. A small horizontal gap at a few meters may not result in a significant reduction in wind guide efficiency but regardless of the size, a closed horizontal gap will most likely result in a better wind guide efficiency.

In a preferred embodiment of the invention, one or more wind guides are installed in front of existing wind turbines whereafter these existing wind turbines are at least partly replaced by new wind turbines that thereafter are exploiting the same existing one or more wind guides. More and more wind farms are being repowered meaning that old smaller and inefficient wind turbines are removed, and new larger and more efficient wind turbines are installed substantially at the same site. In those cases, the wind guides can be arranged and configured so that both the old wind turbines and the new wind turbines will benefit significantly from the wind speed-up effect caused by the presence of the wind guides. This way it may be feasible to install wind guides in existing wind farms with only few more years of lifetime since the same wind guides may be used for the new wind turbines. This can be seen as a mean to increase the total potential market for wind guides.

In a preferred embodiment of the invention, at least parts of at least some of the wind guides have a porosity more than 0, 5, 10, 20, 30, 40, 50, 60 percent. The porosity percentage means the number of percent of the surface area of the wind guide or of a part of the wind guide that is not covered with a substantially airtight material meaning that the percentage of the area where air can pass through. In this invention disclosure, the gaps between the wind guides are not considered to be a part of the porosity. A porous wind guide could comprise trees, bamboo trees, evergreen trees, plants, plated with holes, infill sheets with distances between them in a king post wall, stacks of shipping containers with distances between the top and bottom parts of the shipping containers, a perforated fabric or a perforated tarpaulin, or any other means of letting some air pass through the wind guide. The advantages of using a porous wind guide are for example limiting the wind loads, especially extreme wind loads, onto the wind guide, limiting the recirculation of the wake behind the wind guide that is generated by the presence of the wind guide or to reduce the negative effects of sand drift or snow drift. A porous wind guide may in principle function the same way as a sand fence or a snow fence meaning reducing the wind speed behind the wind guide and thereby increase the amount of sand or snow that will be collected behind the wind guide. Finally, a porous wind guide may under some circumstances be more efficient to speed up the wind, to reduce the wind shear, or to reduce the turbulence intensity at the wind turbine rotor swept area.

In a preferred embodiment of the invention, the wind farm system further comprises an area to grow crops or an agrivoltaic installation to both grow crops and generate photovoltaic power that benefit from the wind-breaking effect of the wind farm system. The benefits of wind breaking in agriculture are already known and applied throughout the world to reduce evapotranspiration (i.e.: water loss occurring from the processes of evaporation and transpiration. Evaporation occurs when water changes to vapor on either soil or plant surfaces. Transpiration refers to the water lost through the leaves of plants). Wind speed typically increases evapotranspiration, especially in very arid environments. Reducing artificially the wind speed with a wind breaker also reduces the evapotranspiration, increasing the efficiency of available water resources, which is especially relevant in arid environments. Additionally, the wind breaker also reduces the risk of damaging the crops due to high-speed winds, especially in desert environments (e.g.: due to sandstorms or sand drifts).

The wind farm systems described in the present application combines the wind breaking effect of the wind guide system with the wake effect of the turbines, resulting in a highly efficient system to harvest wind energy as explained previously and in a higher wind breaking effect than considering a wind braking system alone.

The problems of cultivating crops in arid environments are fundamentally two: the excess heat, and the scarcity of water. The present wind farm system invention can make the water use much more efficient thanks to the reduction of wind speeds and the derived reduction in evapotranspiration, as explained before. But it would be desirable to combine our invention with a solution to reduce excess heat. The combination of our wind farm system with the installation of agrivoltaic technology (Photovoltaic solar panels arranged in a way that allows the cultivation of crops below the structures sustaining the PV panels) reduces heat substantially.

The wind farm system described in the present application, potentially complemented by the agrivoltaic system is a very efficient electricity source. Such electricity can be used to power water infrastructure (e.g.: desalination systems, pumps, and valves to transport water to consumption nodes, pumps to extract water from underground aquifers, etc), partly alleviating the high operational cost of managing water resources.

In a preferred embodiment of the invention, a method to expand an existing wind farm with one extra row of wind turbines with wind guides is disclosed. The average distance between the new extra row of wind turbines with the wind guides and the previous existing row of wind turbines positioned upwind considering the predominant wind direction is less than 90% or 80% or 70% or 60% or 50% or 40% or 30% of the distance between any other consecutive row(s) in the wind farm system and thereby significantly reduce the extra land area needed for expanding the existing wind farm.

In a preferred embodiment of the invention, a method to position wind turbines in a wind farm design is disclosed. The design considers at least two rows of wind turbines positioned one upwind the other according to the predominant wind direction. The most downwind row of wind turbines comprises wind guide(s) and according to this method, at least some of the wind turbines in each of the consecutive rows are positioned very close to each other (the turbines towers of contiguous turbines in the row being positioned at a distance less than 3 times the average rotor diameter of such contiguous turbines) minimizing the effect of prior turbines' wakes in the row downwind thanks to the wind flow optimizing effect of the wind guide(s).

In another preferred embodiment of the invention, a wind farm system comprising at least two neighbouring wind turbines forming at least one row of wind turbines that, preferably but not necessarily, is substantially perpendicular to the predominant wind direction sector (understood as the 90° wind direction sector that concentrate more than 60% of the annual wind energy potential) and at least two wind guides for guiding the wind in front of each of the at least two neighbouring wind turbines from a first direction to a second direction so that the wind flow is accelerated in front of and/or behind each turbine's rotor, is disclosed. The neighbouring wind turbines comprise a tower and a rotor provided with a number of rotor blades defining a rotor swept area. The wind guides comprise a wind guide with a horizontal length, at least one vertical height, a horizontal width and with at least two ends, arranged and configured to receive wind from an altitude below the rotor swept area and to direct the wind so the wind leaving the wind guide has another direction than the wind received by the wind guide. The wind guides are arranged and configured to direct the wind to an area in front of and/or behind the wind turbine rotors' swept area in a way that through such rotors' swept area the wind speed is increased. Additionally, the horizontal gap between the two closest ends of two contiguous wind guides is less than the sum of the length of the rotor diameters of the two wind turbines positioned closest to the two contiguous wind guides. In this case, advanced CFD calculations calibrated with real experimental data have demonstrated that the average wind speed through the rotors increase substantially in comparison with the already known case in which a stand-alone wind turbine and a stand-alone wind guide, or another already known case in which the gap between the two contiguous wind guides is higher than the before mentioned sum of two rotor diameters.

In another preferred embodiment of the invention, the wind farm system comprises at least one wind guide that is ground-based or seabed-based and substantially vertical within a range of +/−10 degrees. A ground-based or seabed-based wind guide will substantially cover an area from the ground or sea surface and upwardly. Also, CFD calculations have shown the best efficiency of the wind guide when it is oriented close to vertical at least on a relatively flat ground. Structural concepts like steel sheet piles, king post walls and shipping container stacking are easiest to install vertically and since the design wind load on wall structures are the same for all wind directions, no significant savings in the structure can be achieved by angling the structure. A large A-shaped lattice structure is an option and that is the main reason for choosing a preferred solution with limitation to the vertical structure at +/−10 degrees.

In another preferred embodiment of the invention, the wind farm system comprises at least one wind guide that has a vertical height between one third and two thirds of the distance between the ground or the sea surface and the wind turbine rotors lowest blade tip height. CFD calculations have shown details about the height of the wake behind the wind guide. This wake height is important because if the wake flow enters the rotor swept area, the blades will suffer more fatigue loads due to the sudden change in wind speed and due to the increase of turbulence in the wake flow. In the stand-alone 90-meter long rotor wind turbine calculations with the 16-meter high and 165-meter long wind guide, the maximum height was 16/(80−45)=0.46 indicating that the height of the wind guide is almost half the distance between the ground and the wind turbine rotors lowers blade tip height.

However, in long continuous wind guides, CFD calculations have determined that the wake formation behind the wind guide and thereby the height of the wake, vary considerably from the centre to the ends of such wind guide. For 5 wind turbines with one continuous wind guide the wake height is significantly higher in the centre than towards the ends of the wind guides. This reduced wake height may be utilised by increasing the height of the wind guide in certain areas of the wind guide, reducing it in others or locating the wind turbines in an optimal location and with a rotor at the optimal height to benefit as much as possible from the speed-up effect that results from the specific wake formation at each area of the continuous wind guide.

The reasoning behind the upper limitation of the wind guide height to two thirds of the distance between the ground and the wind turbines' lowest blade tip height is firstly, to control the cost of the wind guide, as it increases considerably with the height due to the increased wind loads to be carried by the structure, and secondly to avoid the wake of the wind guide enter the swept area of the wind turbine, which would result in increased loads on the wind turbine.

In another preferred embodiment of the invention, the wind farm system comprises only one row of at least two wind turbines and either, a) at least two wind guide in the one row of wind turbines where the horizontal gap between the two closest ends of two contiguous wind guides is less than the sum of the length of the rotor diameters of the two wind turbines positioned closest to the two contiguous wind guides, or b) at least one continuous wind guide covering at least two of the wind turbines.

In another preferred embodiment of the invention, the wind guide(s) further incorporate(s) solar panels to enable the production of hybrid wind-solar energy generation. Solar panels take up very large areas of land that in many cases could have been used for other purposes. Vertical solar panels arrays, or tall structures built solely to exploit solar power is typically not feasible since these structures must be designed to withstand rather large wind loads and from a cost-efficiency standpoint it is much better to construct solar farms horizontally, not vertically. The wind guide, however, is designed to be cost-effective already thanks to is primary objective to increase the wind power production from wind farms. Adding solar panels however can increase the efficiency of the installation further. Today most solar farms comprise solar panels mounted on a simple support structure and positioned in an angle optimized for solar height or with adjustable positioning systems of the solar panel to always, at least partly, face the sun. In the northern hemisphere the solar panels should preferably be facing south. The opposite in the southern hemisphere. In case the wind guide is facing a direction between southeast and southwest (or northeast to northwest) it would be possible to install the solar panels directly on the wind guide and achieve a good efficiency almost all day. Both sides of the wind guide may be used for installing solar panels, so this solution will be good for most sites where the predominant wind direction is between northeast and northwest and also for predominant wind directions from southeast to southwest. When the wind guide is positioned for predominant wind directions from northeast to southeast (or southwest to northeast), the wind guide may create shadows—at least during some parts of the day. This will have a negative impact, but it can still provide a reasonable business case. Another advantage in hybrid wind-solar energy generation is the increased efficiency of the grid connection since the two installations can deliver power to the same grid. This may also be advantageous when the two power generation units can be combined and service on each of the two power generation units can be preferably done when the other one can replace the loss of production due to the service downtime of the other.

In another preferred embodiment of the invention, the wind guide(s) comprise(s) visual impact improvement devices or means to improve the visual impact caused by the wind guide(s). To reduce the wind guide visual impact, artificial or natural creepers or flowers or any other vegetation may be used. In a preferred solution for an exceptionally long wind guide, covering it with green plants may have a significant impact so the observer will experience the wind guide as a slight elevation of the horizon and never even think about it as a man-made structure. The ends of the exceptionally long wind guide may be tapered in a shape fitted to the surroundings, or trees are planted at the ends to shield the abrupt change in height. Another advantage with the exceptionally long wind guide is the fact that it is easy to install an automatic watering system with only one exceptionally long water tube. Also, it is a significant advantage with creepers along the entire surface of the wind guide, since it may disrupt the wind flow slightly and thereby avoid or reduce the risk of wind induced vibrations of the wind guide structure. Finally, the wind guides may comprise trees or even only consist of trees to form the entire wind guide.

In another embodiment of the invention, the wind guide is positioned at a wind turbine, where the maximum power output of the wind turbine is more than 50, 100, 200, 300, 400, 500, 600, 700, 800, 900, 1000, 1500, 2000, 3000, 4000, 5000, 6000, 7000, 8000, 9000, 10000, 11000, 12000, 13000, 14000, 15000, 16000, 17000, 18000, 19000, 20000, 21000, 22000, 23000, 24000 or 25000 kilowatt.

In another embodiment of the invention, the wind guide is positioned at a wind turbine, where the rotor diameter of the wind turbine is more than 2, 5, 10, 20, 30, 40, 50, 60, 70, 80, 90, 100, 110, 120, 130, 140, 150, 160, 170, 180, 190, 200, 210, 220, 230, 240, 250, 260, 270, 280, 290 or 300 meters.

Another preferred embodiment of the invention discloses a method to increase the energy production from a wind farm system. The wind farm system comprising at least two neighbouring wind turbines forming at least one row of wind turbines that, preferably but not necessarily, is substantially perpendicular to the most predominant wind direction and at least two wind guides for guiding the wind in front of each of the at least two neighbouring wind turbines from a first direction to a second direction. The neighbouring wind turbines comprising a tower and a rotor provided with a number of rotor blades defining a rotor swept area. The wind guides comprising a wind guide with a horizontal length, at least one vertical height, a horizontal width and with at least two ends, arranged and configured to receive wind from an altitude below the rotor swept area and to direct the wind so the wind leaving the wind guide has another direction than the wind received by the wind guide. The wind guides are arranged and configured to direct the wind to an area in front of and/or behind the wind turbine rotors' swept area in a way that through such rotors' swept area the wind speed is increased and the horizontal gap between the two closest ends of two contiguous wind guides is less than the sum of the length of the rotor diameters of the two wind turbines positioned closest to the two contiguous wind guides.

FIGURES

The invention will be better understood by reading the following description, given solely by way of non-limiting examples and with reference to the drawings, in which:

FIG. 12 shows a front view of a wind farm system with 7 wind turbines and 7 wind guides.

FIG. 13 shows a front view of a wind farm system with 7 wind turbines and 1 wind guide.

LIST OF POSITIONS NUMBERS

1 Wind Turbine
2 Wind Turbine Blade
3 Tower
4 Rotor Swept Area
5 Wind Direction
6 Wind Guide
7 Ground
D Rotor Diameter
G Gap Between the Two Closest Ends of Two Contiguous Wind guides
h Distance Between the Ground and the Wind Turbine Rotors Lowest Blade Tip Height
vh Vertical Height of the Wind guide. Measured as the Distance Between the Top of the Wind guide and the Ground or Sea Surface.
d Distance Between the Position of the Lowest Blade Tip of the Wind Turbine Rotor and the Closest Wind guide Top Edge
d1 Projection in the horizontal plane of the distance Between the Position of the Lowest Blade Tips of the Wind Turbine Rotors and the Closest Wind guides Top Edge
d2 Projection in the horizontal plane of the distance Between the Position of the Lowest Blade Tips of the Wind Turbine Rotors and the Closest Wind guides Top Edge
d3 Projection in the horizontal plane of the distance Between the Position of the Lowest Blade Tips of the Wind Turbine Rotors and the Closest Wind guides Top Edge
d4 Projection in the horizontal plane of the distance Between the Position of the Lowest Blade Tips of the Wind Turbine Rotors and the Closest Wind guides Top Edge
d5 Projection in the horizontal plane of the distance Between the Position of the Lowest Blade Tips of the Wind Turbine Rotors and the Closest Wind guides Top Edge
d6 Projection in the horizontal plane of the distance Between the Position of the Lowest Blade Tips of the Wind Turbine Rotors and the Closest Wind guides Top Edge
d7 Projection in the horizontal plane of the distance Between the Position of the Lowest Blade Tips of the Wind Turbine Rotors and the Closest Wind guides Top Edge
h1 Vertical Height of a Wind guide
h2 Vertical Height of a Wind guide
h3 Vertical Height of a Wind guide
h4 Vertical Height of a Wind guide
h5 Vertical Height of a Wind guide
h6 Vertical Height of a Wind guide
h7 Vertical Height of a Wind guide
h8 Vertical Height of a Wind guide
h9 Vertical Height of a Wind guide

DETAILED DESCRIPTION

Figure 1:
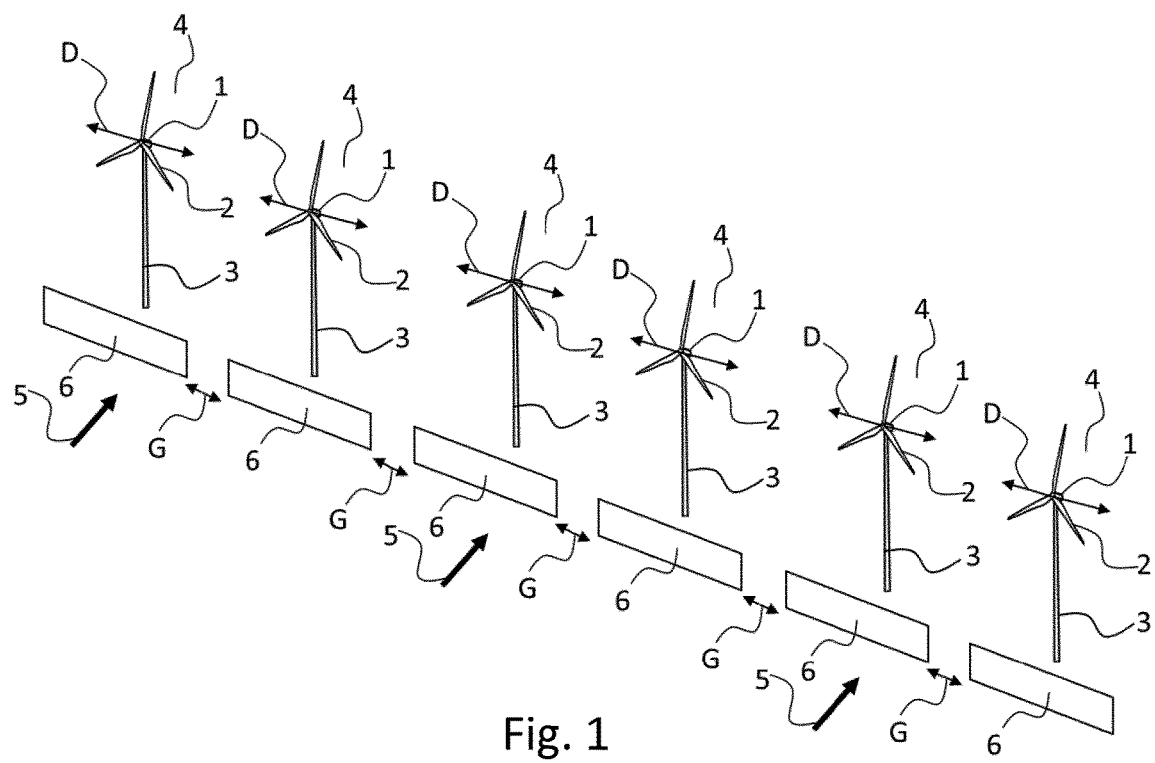
FIG. 1 shows a perspective front view of a wind farm system with gaps between the wind guides.

In FIG. 1 is shown a perspective front view of a wind farm system with 6 wind turbines (1) and 6 wind guides (6) with horizontal gaps (G) between each of the wind guides (6). The horizontal gaps (G) are, according to the invention, less than the sum of the lengths of the rotor diameters (D) of the two wind turbines positioned closest to the two contiguous wind guides. At the drawing all wind turbines have identical rotor diameters (D), so in this case, the horizontal gaps are less than 2 times the rotor diameter (D) of one wind turbine (1). The wind direction is shown with 3 arrows pointing in the direction the wind flows.

Figure 2:
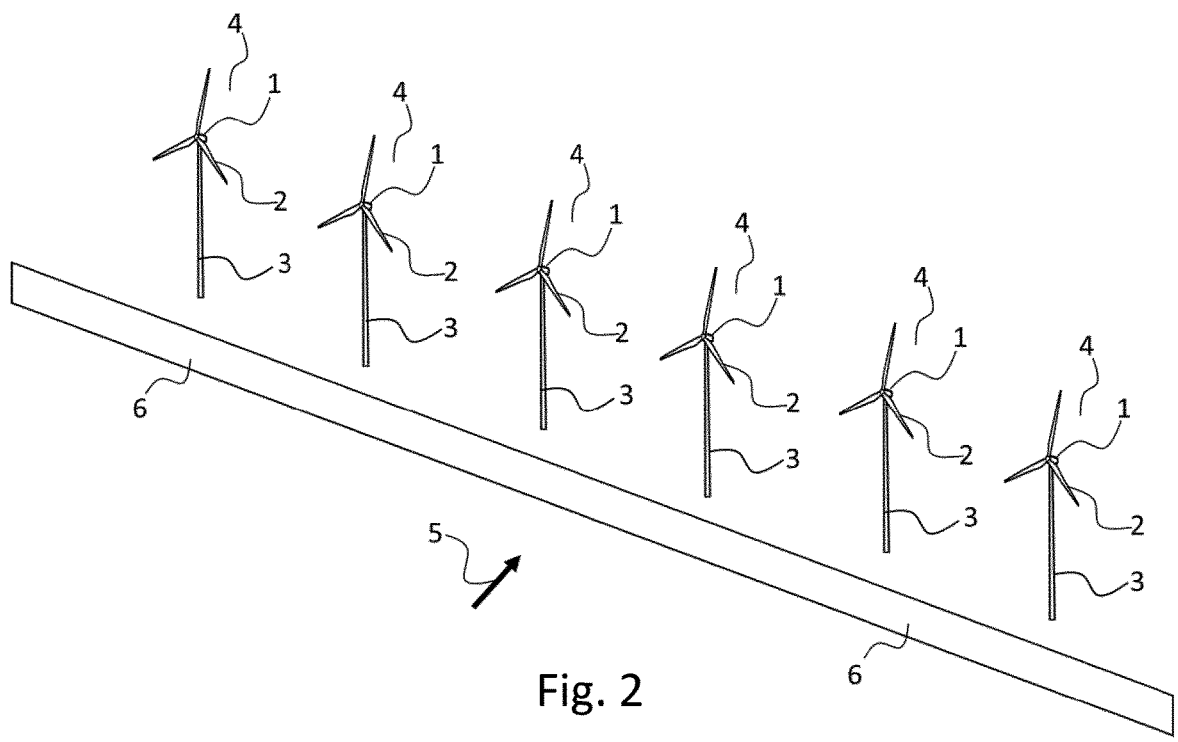
FIG. 2 shows a perspective front view of a wind farm system with one continuous wind guide to cover all the wind turbines.

In FIG. 2 is shown a perspective front view of a wind farm system with 6 wind turbines (1) and one continuous wind guide (6) to cover all the 6 wind turbines. There are no horizontal gaps between the wind guides or the horizontal gaps are zero. According to the invention, the horizontal gaps are less than the sum of the lengths of the rotor diameters of the two wind turbines positioned closest to the two contiguous wind guides. In this case the horizontal gaps are zero, so this case is covered by the invention disclosure, since zero is less than 2 times the rotor diameter of one of the identical wind turbines.

Figure 3:
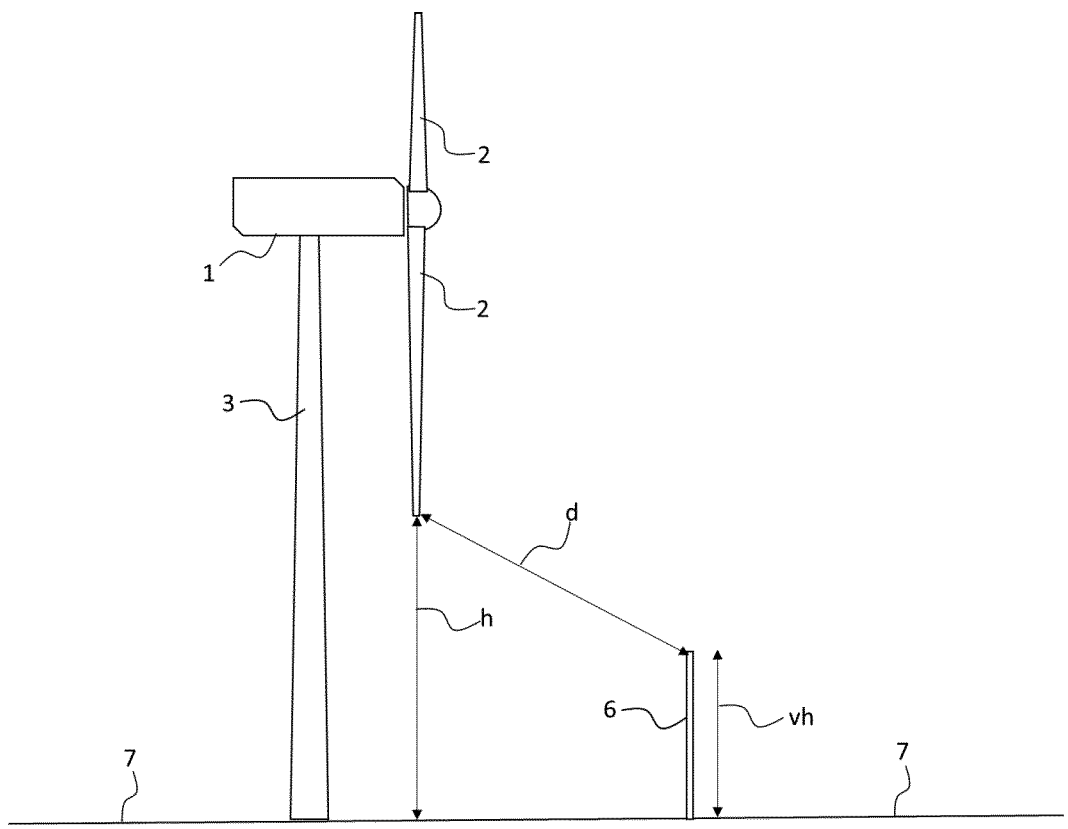
FIG. 3 shows a side view of a wind turbine and a ground-based wind guide

In FIG. 3 is shown a side view of a wind turbine (1) and a ground-based wind guide (6). The wind guide (6) could as well be seabed-based or floating on the sea surface and it is substantially vertically oriented, although it could as well be angled up to 10 degrees to each side. The wind guide could have, as according to this invention disclosure, a vertical height (vh) that is between one third and two thirds of the distance between the ground, seabed, or the sea surface and the wind turbine rotors lowest blade tip height. The distance (d) between the lower blade tip position and the wind guide top edge is also shown in the figure, since this distance is used in FIGS. 8-13. The wind turbine rotors lowest blade tip height means the lowest point of the wind turbine rotor swept area and therefore the lowest vertical position the blade tips will take when the wind turbine rotor is rotating. The wind guide is, in FIG. 3, positioned at a distance in front of the wind turbine (the wind direction is from right to left and it is not shown in FIG. 3) but it could as well be aligned with the wind turbine tower and thereby substantially speed-up the wind behind the rotor swept area and thereby substantially speed-up the wind through the wind turbine rotor to increase the power production from the wind turbine.

Figure 4:
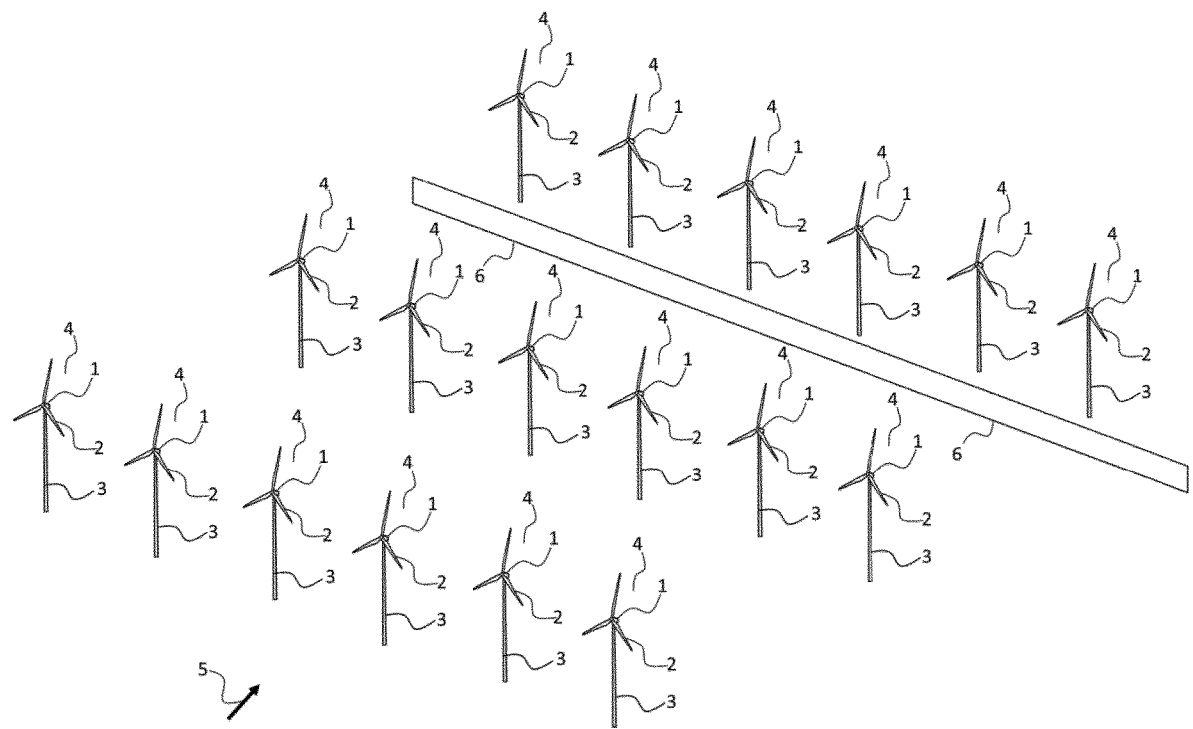
FIG. 4 shows a perspective front view of a wind farm system with 3 rows of wind turbines and a continuous wind guide covering the last row.

In FIG. 4 is shown a perspective front view of a wind farm system with 3 rows of 6 wind turbines (1) in each row and a continuous wind guide (6) covering the last row being the row downwind in relation to the other two rows in the wind farm. This is in accordance with this invention disclosure, where the wind farm system comprises at least two rows of wind turbines substantially parallel to each other and located substantially one behind the other considering the predominant wind direction, where the wind guides are located only at the last row of wind turbines in the wind farm system being such row located downwind to the other rows of wind turbines in the wind farm considering the predominant wind direction. CFD calculations of the set-up shown in FIG. 4, have shown surprisingly good results since the wind flow will be influenced by one or two wind turbines before it reaches the wind turbines with the wind guide in the last row. CFD calculations have also shown that, the speed-up of the wind around the wind turbine rotors bottom part in the 2 front rows caused by the induction that is caused by the operating wind turbines extracting energy from the wind in the front rows, is the main reason for the higher speed-up by the wind guide located in the last row compared to a case where the wind turbines with the wind guide were in a single row wind farm. This front wind turbine induced speed-up effect is combined with the effect originating from a wind guide.

Figure 5:
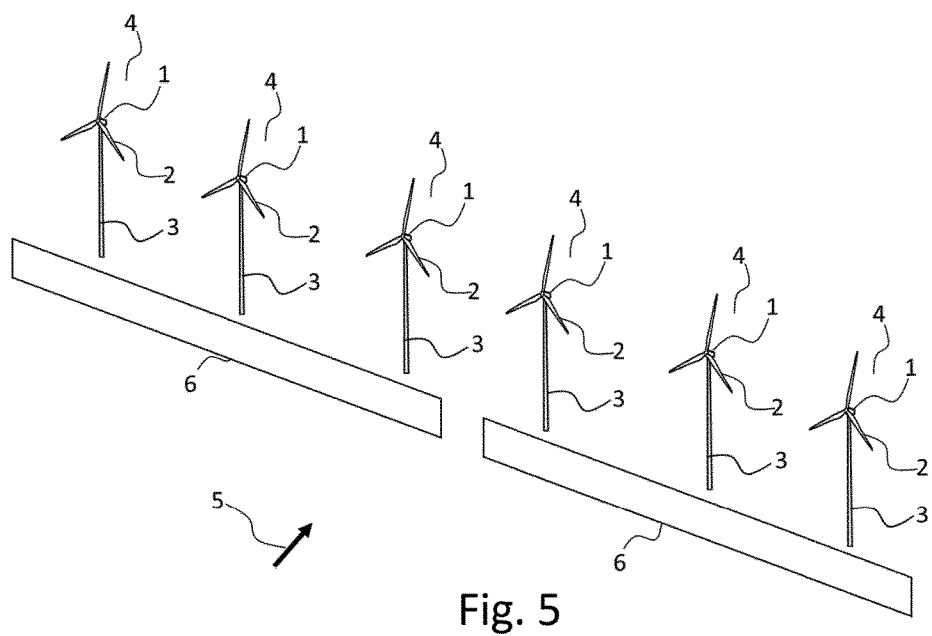
FIG. 5 shows a perspective front view of a wind farm system with two wind guides each covering three wind turbines.

In FIG. 5 is shown a perspective front view of a wind farm system with 6 wind turbines (1) and two wind guides (6) each covering three wind turbines. This is in accordance with this invention disclosure where at least two contiguous wind guides connect through its closest ends to form one substantially continuous wind guide. The higher the number of wind turbines sharing one continuous wind guide, the better the effect to increase the wind speed-up effect compared to a single wind turbine with one wind guide. When 3 or more wind turbines share one continuous wind guide, this effect is significant. Also, there could be reasons for designing exceptionally long wind guides with gaps for local farmers, animals or wind turbine service personnel and equipment to easily pass through to the other side of the wind guide and there could be cases where roads go through a wind farm with wind guides.

Figure 6:
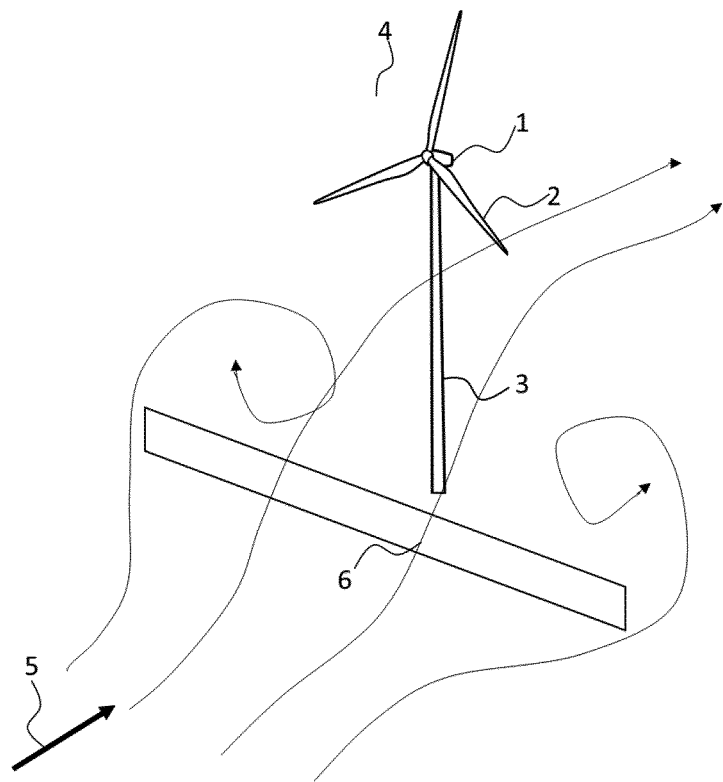
FIG. 6 shows a perspective front view of a wind turbine with a wind guide and streamlines showing the wind flow pattern.

In FIG. 6 is shown a perspective front view of a wind turbine (1) with a wind guide (6) and streamlines showing the wind flow pattern. As described previously, the solution with a single wind turbine with a single wind guide substantially show two major aerodynamic losses where FIG. 6 show one of them. It is shown how a considerable amount of wind flow escape at the two ends of the wind guide and thereby lose wind flow that, as according to the present invention disclosure, can be reduced and thereby improve the wind speed increase for two or more contiguous wind turbines.

Figure 7:
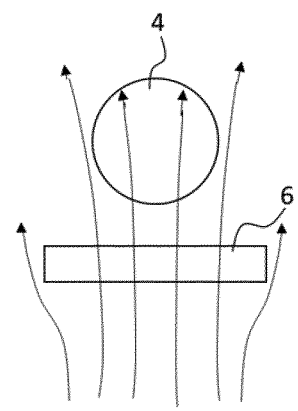
FIG. 7 shows a front view of a wind turbine rotor swept area with a wind guide and streamlines showing the wind flow pattern.

In FIG. 7 is shown a front view of a wind turbine rotor swept area (4) with a wind guide (6) and streamlines showing the wind flow patterns. As described previously, the solution with a single wind turbine with a single wind guide substantially show two major aerodynamic losses, where FIG. 7 shows one of them. It is shown that the wind leaving the wind guide diverge to the two sides in front of the rotor swept area. This divergence of the flow result in a reduced wind speed passing through the rotor as compared to a flow where there is no or little divergence of the wind flow in front of the wind turbine rotor swept area. In case 9 contiguous wind turbines share the same continuous wind guide, this flow divergence will be small and the efficiency of the wind guide to speed-up the wind will be improved as according to the present invention disclosure. In the case of infinite number of wind turbines sharing the same continuous wind guide, the wind flow would be 2-dimensional and there would be no flow divergence.

Figure 8:
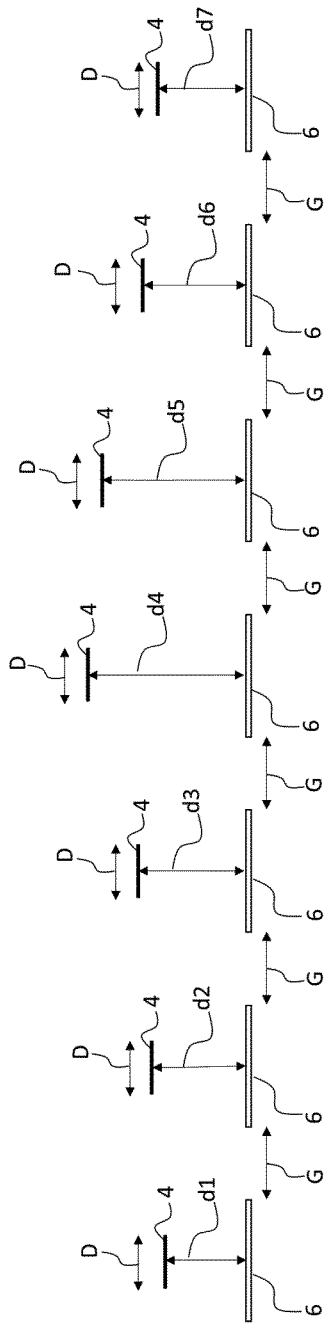
FIG. 8 shows a top view of a wind farm system with 7 wind turbines and 7 wind guides.

In FIG. 8 is shown a top view of a wind farm system with 7 wind turbines represented by the projection in the horizontal plane of the rotor swept area (4) and 7 wind guides (6) with a gap (G) between them and the wind farm system is in a special layout. This layout is in accordance with the disclosure of the present invention where the distance between the position of the lowest wind turbine rotor blade tips of the wind turbine rotors and the closest wind guides top edges are different depending on the wind turbines relative position in a row of wind turbines with one or more wind guide(s). In FIG. 8 the projections in the horizontal plane of such distances are named d1 to d7 and in a preferred solution as shown in FIG. 8, $d1 \leq d2 \leq d3 \leq d4$ and $d4 \geq d5 \geq d6 \geq d7$ since CFD calculations have shown this to be an optimum solution for a wind farm system situated in a flat area with low surface roughness.

Figure 9:
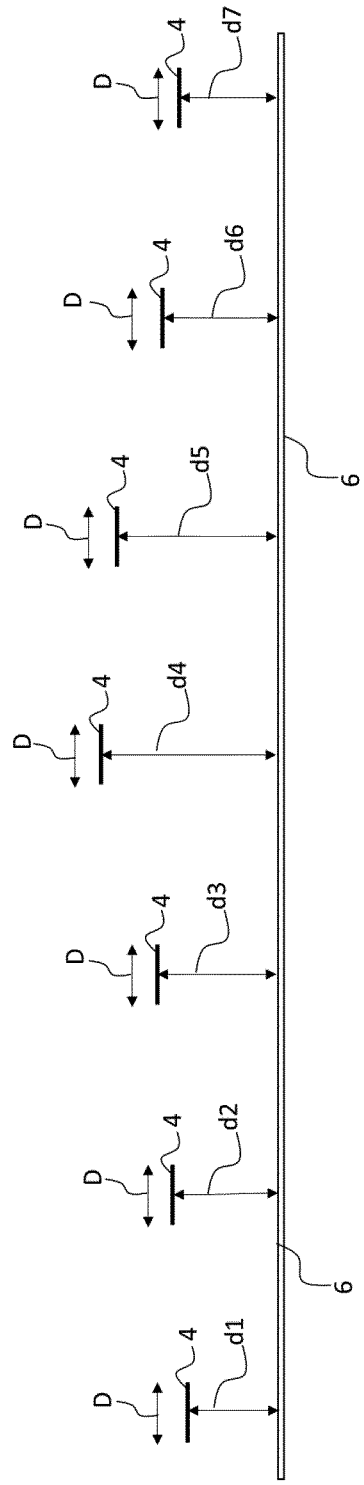
FIG. 9 shows a top view of a wind farm system with 7 wind turbines and one wind guide.

In FIG. 9 is shown a top view of a wind farm system with 7 wind turbines represented by the projection in the horizontal plane of the rotor swept area (4) and one continuous wind guide (6) covering all 7 wind turbines in a special layout. This layout is in accordance with the disclosure of the present invention where the distance between the position of the lowest wind turbine rotor blade tips of the wind turbine rotors and the closest wind guides top edges are different depending on the wind turbines relative position in a row of wind turbines with one or more wind guide(s). In FIG. 9 the projections in the horizontal plane of such distances are named d1 to d7 and in a preferred solution as shown in FIG. 9, $d1 \leq d2 \leq d3 \leq d4$ and $d4 \geq d5 \geq d6 \geq d7$, since CFD calculations have shown this to be an optimum solution for a wind farm system situated in a flat area with low surface roughness.

Figure 10:
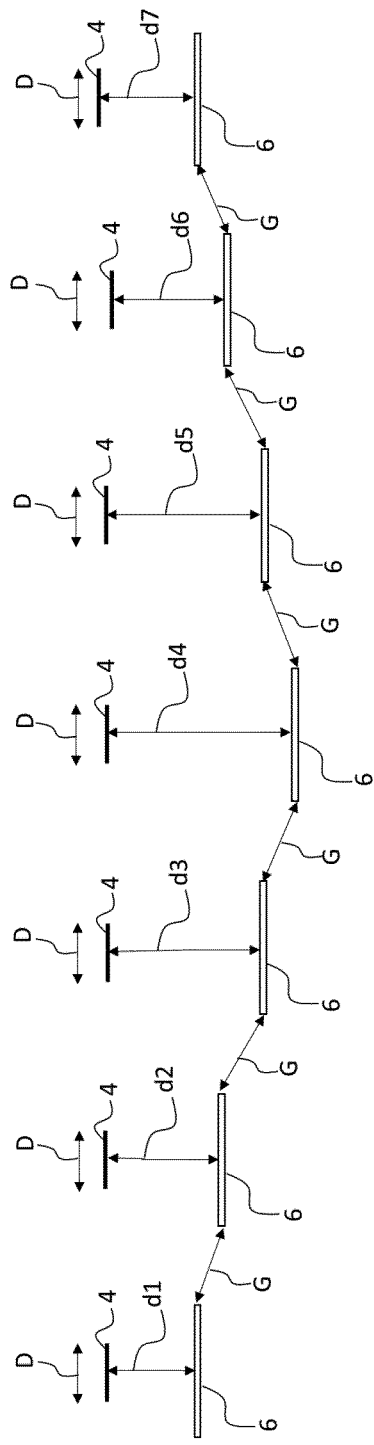
FIG. 10 shows a top view of a wind farm system with 7 wind turbines and 7 wind guides.

In FIG. 10 is shown a top view of a wind farm system with 7 wind turbines represented by the projection in the horizontal plane of the rotor swept area (4) and 7 wind guides (6) with a gap (G) between them. The layout is typical for an existing wind farm, where the wind turbines are situated in a row forming a straight line and where the wind guides are not situated in one straight line. This layout is in accordance with the disclosure of the present invention where the distance between the position of the lowest wind turbine rotor blade tips of the wind turbine rotors and the closest wind guides top edges are different depending on the wind turbines relative position in a row of wind turbines with one or more wind guide(s). In FIG. 10, the projections in the horizontal plane of such distances are named d1 to d7 and in a preferred solution as shown in FIG. 10, d1≤d2≤d3≤d4 and d4≥d5≥d6≥d7, since CFD calculations have shown this to be an optimum solution for a wind farm system situated in a flat area with low surface roughness.

Figure 11:
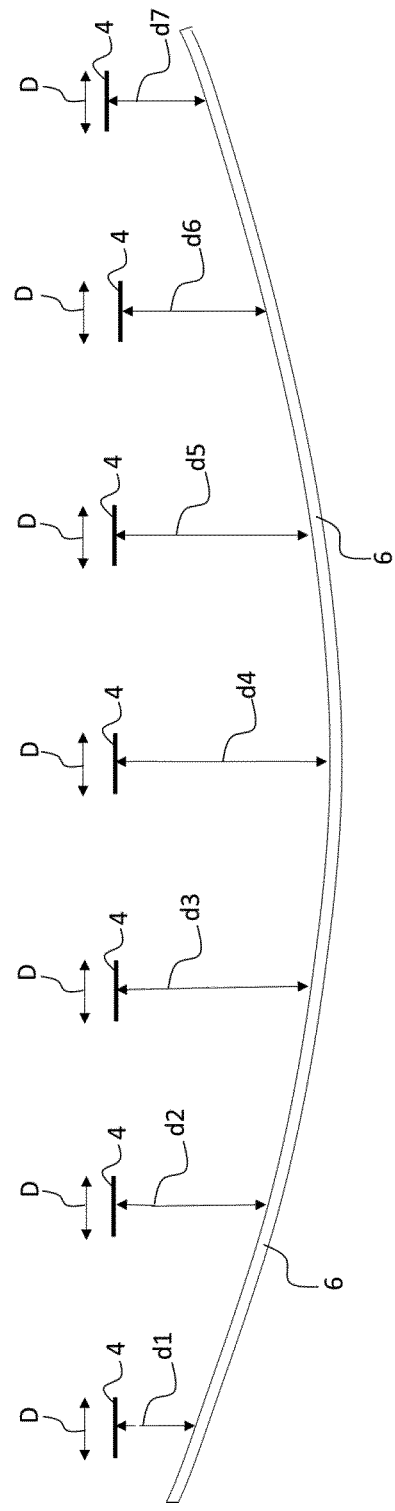
FIG. 11 shows a top view of a wind farm system with 7 wind turbines and 1 wind guides.

In FIG. 11 is shown a top view of a wind farm system with 7 wind turbines represented by the projection in the horizontal plane of the rotor swept area (4) and 1 wind guides (6). The layout is typical for an existing wind farm, where the wind turbines are situated in a row forming a straight line. The wind guide is curved to optimize the position of the wind guide relative to the position of the wind turbines. This layout is in accordance with the disclosure of the present invention where the distance between the position of the lowest wind turbine rotor blade tips of the wind turbine rotors and the closest wind guides top edges are different depending on the wind turbines relative position in a row of wind turbines with one or more wind guide(s). In FIG. 11 the projections in the horizontal plane of such distances are named d1 to d7 and in a preferred solution as shown in FIG. 11, d1≤d2≤d3≤d4 and d4≥d5≥d6≥d7, since CFD calculations have shown this to be an optimum solution for a wind farm system situated in a flat area with low surface roughness.

In FIG. 12 is shown a front view of a wind farm system with 7 wind turbines represented by their rotor swept area (4) and the tower (3) and 7 wind guides (6) positioned with a gap (G) between them and in front of the wind turbines. This layout is in accordance with the disclosure of the present invention where the wind farm system comprises wind guide(s) with different vertical height(s). In FIG. 12 these vertical heights are named h1 to h7 and in a preferred solution as shown in FIG. 12, h1≥h2≥h3≥h4 and h4≤h5≤h6≤h7, since CFD calculations have shown this to be an optimum solution for a wind farm system situated in a flat area with low surface roughness.

In FIG. 13 is shown a front view of a wind farm system with 7 wind turbines represented by their rotor swept area (4) and the tower (3) and 1 continuous wind guide (6) covering all the 7 wind turbines. This layout is in accordance with the disclosure of the present invention where the wind farm system comprises wind guide(s) with different vertical height(s). In FIG. 13 these vertical heights are local vertical heights at different positions of the continuous wind guide and the heights are named h1 to h9 and in a preferred solution as shown in FIG. 13, h1≥h2≥h3≥h4≥h5 and h5≤h6≤h7≤h8≤h9, since CFD calculations have shown this to be an optimum solution for a wind farm system situated in a flat area with low surface roughness.

Figure 14:
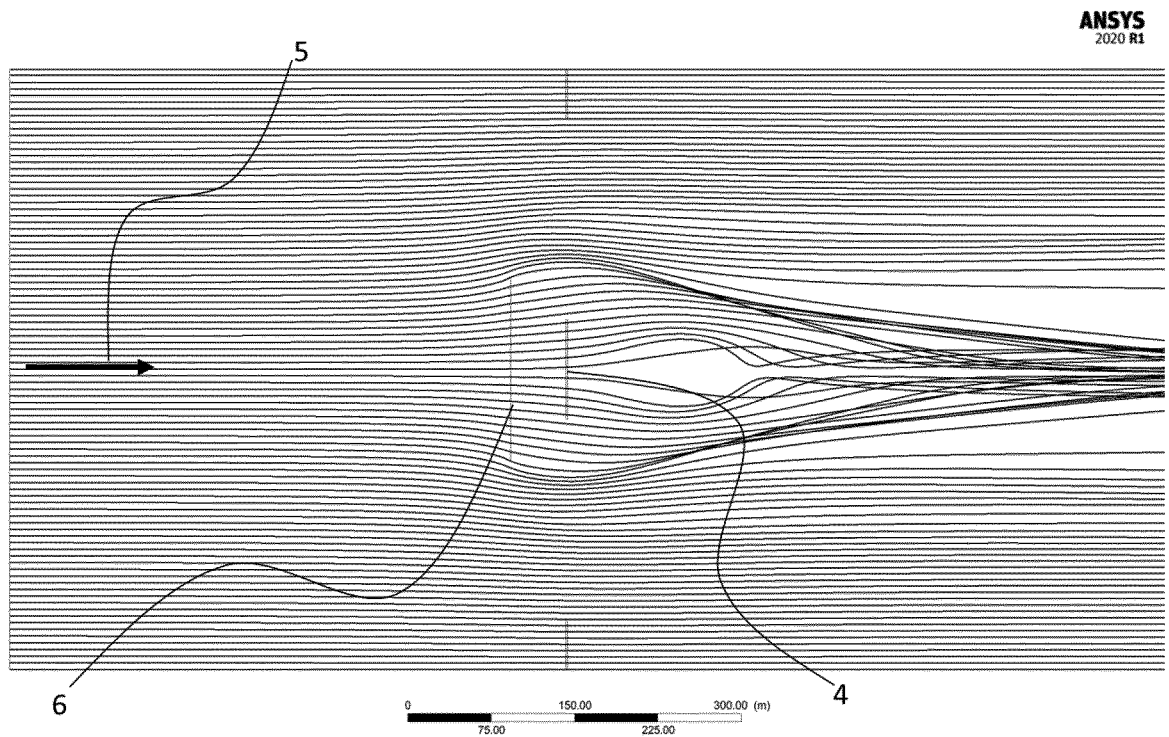
FIG. 14 shows a top view of a wind turbine rotor swept area with a wind guide and streamlines showing the flow pattern.

In FIG. 14 is shown a top view of a wind turbine rotor swept area (4) with a wind guide (6) and streamlines showing the flow pattern. The wind flow (5) starts from the left side and flows towards the right side and the starting height position for the streamlines in the far-left side is 8-meter height above ground or sea surface. One 165 meter long and 16 meters high wind guide is positioned in front of the wind turbine rotor swept area. In this CFD calculation the actuator disk function is turned off, so the flow is not influenced by the induction caused by the wind turbine rotor and the 90 meters diameter wind turbine rotor swept area is, therefore only included in the figure to show the position where the wind turbine rotor may be located. In case the actuator disk was included to model the induction from the wind turbine rotor, the horizontal divergence of the flow just in front of the wind turbine rotor swept area would have shown a larger divergence of the wind flow. This divergence is one of the two aerodynamic losses that are exceptionally large for a single wind turbine with a single wind guide, as shown in FIG. 14. The other exceptionally large aerodynamic loss is caused by the wind flow escaping at the two ends of the wind guide. The streamlines behind the two ends of the wind guide are very closely spaced indicating a relatively high wind speed indicating a relatively large aerodynamic loss since the wind flow that escapes at the ends of the wind guide will not be exploited to speed-up the wind flow at the wind turbine rotor height and therefore it is to be considered as a total aerodynamic loss. The main option in the present invention disclosure is to reduce these two aerodynamic losses and thereby improve the efficiency of the wind guide.

Figure 15:
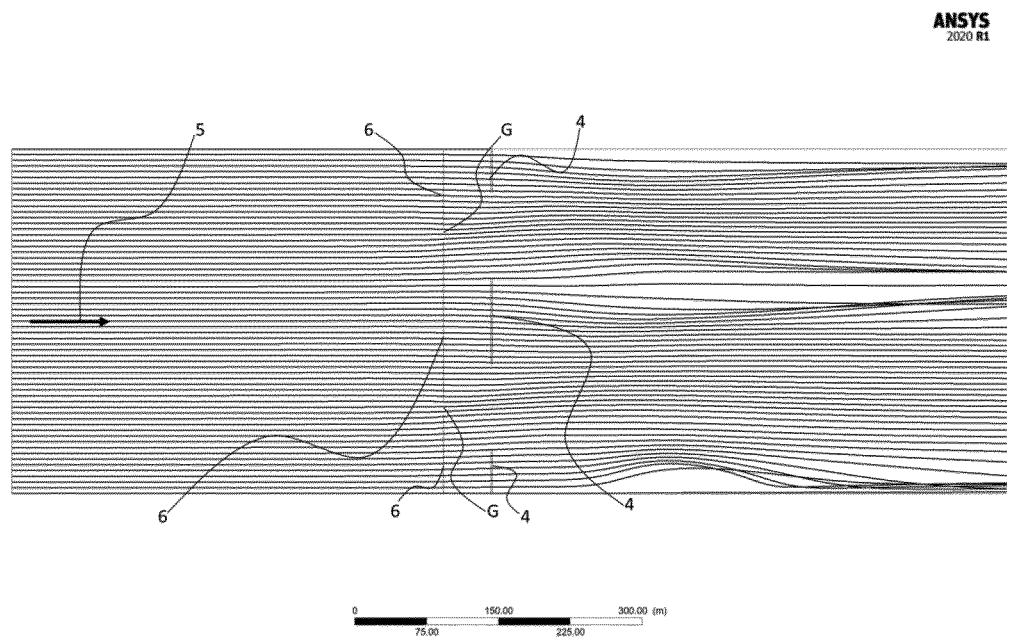
FIG. 15 shows a top view of a wind turbine rotor swept area and 2 half parts of a wind turbine rotor swept area and a wind guide in full length and 2 half wind guides and streamlines showing the flow pattern.

FIG. 15 shows a top view of a wind turbine rotor swept area (4) and 2 half parts of a wind turbine rotor swept area (4) and a wind guide (6) in full length and 2 half wind guides (6) and streamlines showing the flow pattern. The wind flow (5) starts from the left side and flows towards the right side and the starting height position for the streamlines in the far-left side is 8-meter height above ground or sea surface. One 165 meter long and 16 meters high wind guide is positioned in front of the wind turbine rotor swept area at the centre of FIG. 15. The horizontal gaps (G) between the closest ends of two contiguous wind guides is 15 meters. In the CFD calculation 9 wind identical wind turbines with 9 identical wind guides was simulated. In FIG. 15 only the centre wind turbine with its wind guide and two half parts of the wind turbines with their wind guide systems are shown. In this CFD calculation the actuator disk function is turned off, so the flow is not influenced by the induction caused by the wind turbine rotors and the 90 meters diameter wind turbine rotor swept areas are, therefore only included in the figure to show the position where the wind turbine rotors may be located. When comparing the flow pattern between FIG. 14 and FIG. 15 it is obvious that both the wind flow divergence and the wind flow escaping at the ends of the wind guide is much smaller in the case showing the centre positioned wind guide out of 9 wind guides as shown in FIG. 15. Therefore, it is obvious that the total aerodynamic loss is much larger for a single wind guide than for a row of 9 wind guides with dimensions as described above, when the wind guides are positioned with a 15-metre horizontal gap between them. The main option in the present invention disclosure is to reduce the aerodynamic losses and thereby improve the efficiency of the wind guide.

Figure 16:
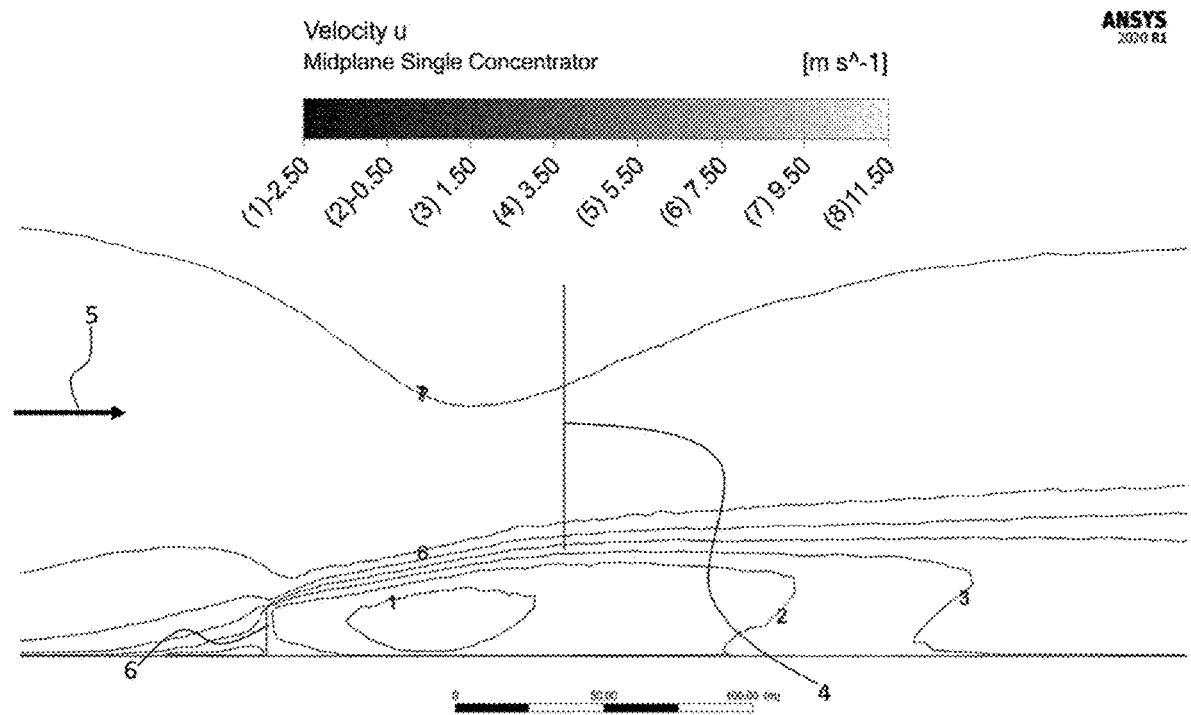
FIG. 16 shows a side view of a wind turbine and a wind guide and contour lines illustrating the wind speed.

In FIG. 16 is shown a side view of a wind turbine represented by its rotor swept area (4) and a wind guide (6) and contour lines illustrating the wind speed. The wind flow (5) comes from the left side and flows towards the right side in FIG. 16. One 165 meter long and 16 meters high wind guide is positioned in front of the wind turbine rotor swept area. In this CFD calculation the actuator disk function is turned off, so the flow is not influenced by the induction caused by the wind turbine rotor and the 90 meters diameter wind turbine rotor swept area is, therefore only included in the figure to show the position where the wind turbine rotor may be located. The contour lines show the horizontal component of the wind speed and it can be seen that in the wake behind the wind guide, the wind flow is negative, indicating that the wind flow flows from right to left in the figure. For example, the contour line 1 show a wind speed at −2.5 m/s. The contour line 7 show the line where the wind speed is 9.5 m/s. Above this line the wind speed is higher than 9.5 m/s. The influence from the wind guide has a positive effect on the wind speed both from the top, where the 9.5 m contour line drops down into the rotor swept area and from the 7.5 m/s contour line that rises into the rotor swept area.

Figure 17:
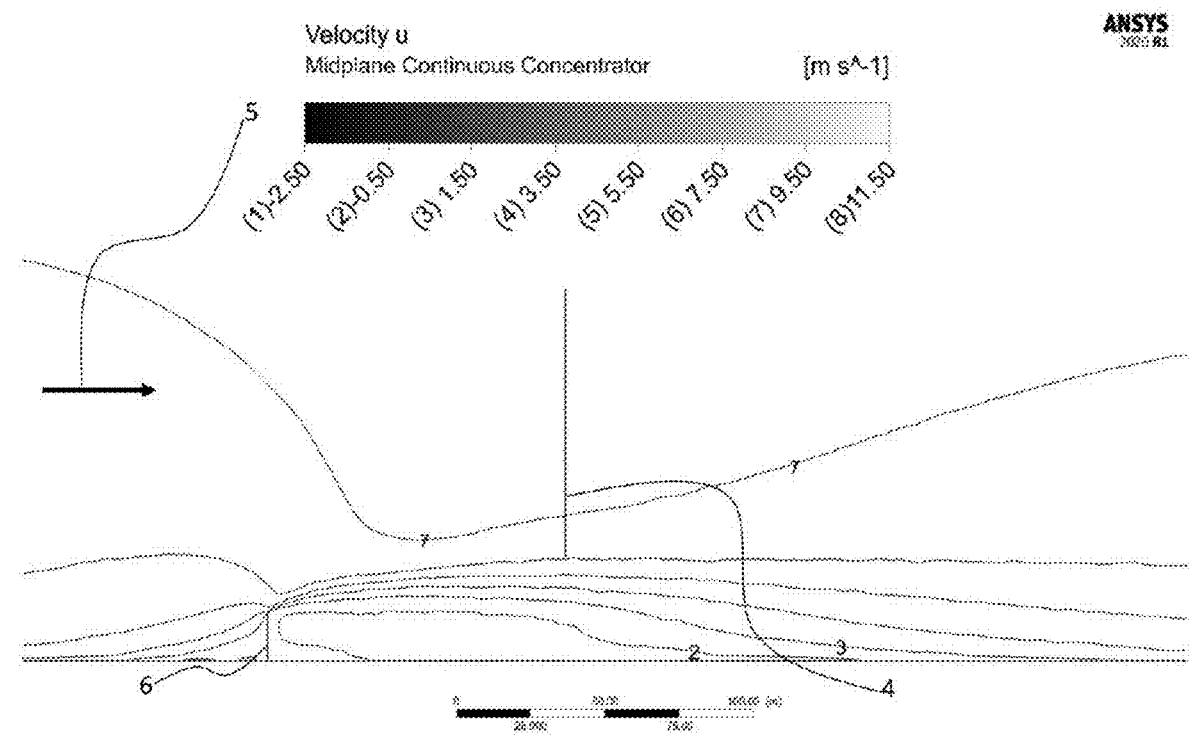
FIG. 17 shows a side view of a wind turbine and a wind guide and contour lines illustrating the wind speed.

In FIG. 17 is shown a side view of a wind turbine represented by its rotor swept area (4) and a wind guide (6) and contour lines illustrating the wind speed. The wind flow comes from the left side and flows towards the right side in FIG. 17. One 165 meter long and 16 meters high wind guide is positioned in front of the wind turbine rotor swept area. In this CFD calculation the actuator disk function is turned off, so the flow is not influenced by the induction caused by the wind turbine rotor and the 90 meters diameter wind turbine rotor swept area is, therefore only included in the figure to show the position where the wind turbine rotor may be located. The contour lines show the horizontal component of the wind speed similar to those shown in FIG. 16. The input data for the CFD calculation are identical to the input data used to calculate the result shown in FIG. 15. FIG. 17 show the results when including 9 wind turbines and 9 wind guides with a 15-meter gap between the two contiguous ends of the wind guides. In FIG. 17 the horizontal wind speed is much higher at the wind turbine rotor swept area than in the single wind turbine case shown in FIG. 16. The 9.5 m/s contour line covers almost the entire wind turbine rotor swept area, whereas in FIG. 16 it only covers less than half the wind turbine rotor swept area.

Items

1. A wind farm system comprising at least two neighbouring wind turbines forming at least one row of wind turbines that is substantially perpendicular to the most predominant wind direction and at least two wind guides for guiding the wind in front of each of the at least two neighbouring wind turbines from a first direction to a second direction;
   the neighbouring wind turbines comprising a tower and a rotor provided with a number of rotor blades defining a rotor swept area;
   the wind guides comprising a wind guide with a horizontal length, at least one vertical height, a horizontal width and with at least two ends, arranged and configured to receive wind from an altitude below the rotor swept area and to direct the wind so the wind leaving the wind guide has another direction than the wind received by the wind guide;
   the wind guides are arranged and configured to direct the wind to an area in front of and/or behind the wind turbine rotors' swept area in a way that through such rotors' swept area the wind speed is increased characterised in that the horizontal gap between the two closest ends of two contiguous wind guides is less than the sum of the length of the rotor diameters of the two wind turbines positioned closest to the two contiguous wind guides.
2. The wind farm system according to item 1, characterised in that at least two contiguous wind guides connect through its closest ends to form one substantially continuous wind guide.
3. The wind farm system according to any of the items 1-2, characterised in that the wind guide(s) is (are) ground-based or seabed-based and is (are) substantially vertical within a range of +/−10 degrees.
4. The wind farm system according to any of the items 1-3, characterized in that the wind guide(s) has (have) a vertical height between one third and two thirds of the distance between the ground or the sea surface and the wind turbine rotors lowest blade tip height.
5. The wind farm system according to any of the items 1-4, characterised in that the distance between at least two of the wind turbines in said wind farm system is less than 1.1, 1.5, 2, 2.5, 3, 3.5, 4, 4.5, 5, 5.5, 6, 6.5, 7, 7.5, 8, 8.5, 9, 9.5 or 10 wind turbine rotor diameters.
6. The wind farm system according to any of the items 1-5, characterised in that said wind farm system comprises at least two rows of wind turbines substantially parallel to each other and located substantially one behind the other considering the predominant wind direction, where the wind guides are located only at the last row of wind turbines in the wind farm system being such row located downwind to the other rows of wind turbines in the wind farm considering the predominant wind direction.
7. The wind farm system according to any of the items 1-5 characterised in that said wind farm system comprises only one row of wind turbines and only one wind guide covering at least two of the wind turbines in the one row of wind turbines.
8. The wind farm system according to any of the items 1-7, characterised in that said wind farm system comprises at least 3, 4, 5, 10, 15, 20, 25, 30, 35, 40, 45, 50, 55, 60, 65, 70, 75, 80, 85, 90, 95, 100, 120, 140, 160, 180, 200, 250, 300, 350, 400, 450 or 500 wind turbines.
9. The wind farm system according to any of the items 1-8, characterised in that the wind farm system comprises wind guide(s) with different vertical height(s).
10. The wind farm system according to any of the items 1-9, characterised in that the distance between the position of the lowest wind turbine rotor blade tips of the wind turbine rotors and the closest wind guides top edges are different depending on the wind turbines relative position in a row of wind turbines with one or more wind guide(s).
11. The wind farm system according to any of the items 1-10, characterised in that the wind guide(s) further incorporate(s) solar panels to enable the production of hybrid wind-solar energy generation.
12. The wind farm system according to any of the items 1-11 characterised in that the wind guide(s) comprise(s) visual impact improvement devices or means to improve the visual impact caused by the wind guide(s).
13. A method to increase the energy production from a wind farm system comprising at least two neighbouring wind turbines forming at least one row of wind turbines that is substantially perpendicular to the most predominant wind direction and at least two wind guides for guiding the wind in front of each of the at least two neighbouring wind turbines from a first direction to a second direction;
    the neighbouring wind turbines comprising a tower and a rotor provided with a number of rotor blades defining a rotor swept area;
    the wind guides comprising a wind guide with a horizontal length, at least one vertical height, a horizontal width and with at least two ends, arranged and configured to receive wind from an altitude below the rotor swept area and to direct the wind so the wind leaving the wind guide has another direction than the wind received by the wind guide;

the wind guides are arranged and configured to direct the wind to an area in front of and/or behind the wind turbine rotors' swept area in a way that through such rotors' swept area the wind speed is increased characterised in that the horizontal gap between the two closest ends of two contiguous wind guides is less than the sum of the length of the rotor diameters of the two wind turbines positioned closest to the two contiguous wind guides.

The invention claimed is:

1. A wind farm system comprising: at least three rows of wind turbines, each row comprising at least three wind turbines positioned adjacent to each other within each row, such row facing the predominant wind direction and located one row behind another considering the predominant wind direction, and comprising wind guides for at least three of the wind turbines in only one row of the rows for blocking and thereby guiding the wind in front of the wind turbines from a first direction to a second direction;
  the wind turbines each comprising a tower and a rotor provided with a number of rotor blades defining a rotor swept area;
  the wind guides being ground-based, seabed-based or floating in the sea surface and with a horizontal length and a vertical height defining an area standing vertically within a range of +/−10 degrees;
  each of the wind guides defining: the horizontal length between two lateral ends thereof not lower than 1 time the length of a diameter of the rotor of the closest wind turbine;
  the vertical height being constant or variable along the horizontal length and not lower than 3 meters and not higher than two thirds of the height of a blade tip of the blades of the closest wind turbine rotor when positioned at its lowermost position;
  a horizontal width being constant or variable along the horizontal length and always lower than 1.5 times the vertical height of the wind guides;
  each of the wind guides being arranged and configured to block and thereby guide the wind at an altitude below the rotor swept area so the wind behind the wind guides has another direction and speed than the wind in front of the wind guides;
  each of the wind guides being arranged and configured to direct the wind to an area in front of and/or behind the wind turbine rotor swept areas so that the wind speed through the rotor swept areas is increased: and
  characterized in that the wind guides are located at the last of the at least three rows of the wind turbines in the wind farm system, being such row with wind guides located downwind to another row(s) of the rows of the wind turbines in the wind farm system considering the predominant wind direction;
  and characterized in that the horizontal gap between the two closest ends of two adjacent wind guides is less than the sum of the lengths of the rotor diameters of the two wind turbines positioned closest to the two adjacent wind guides.

2. The wind farm system according to claim 1, characterized in that at least one of the wind guides is positioned at a distance from the closest wind turbine and has no physical contact with the closest wind turbine.

3. The wind farm system according to claim 1, characterized in that a distance between the lowest position of the wind turbine rotor blade tips of each wind turbine rotor and the top edges of the closest wind guide is lower closer to the ends of the one row of wind turbines with wind guides, and is higher closer to the center of the one row of wind turbines with the wind guides.

4. The wind farm system according to claim 1, characterized in that at least parts of at least some of the wind guides have a porosity.

5. A method for increasing energy production in a wind farm system, the method comprising:
  arranging at least three rows of wind turbines, each row comprising at least three wind turbines positioned adjacent to each other within each row, such rows facing the predominant wind direction; and located one row behind another considering the predominant wind direction;
  providing a wind turbine structure for each wind turbine, each wind turbine comprising a tower and a rotor with a number of rotor blades defining a rotor swept area;
  installing wind guides in front of at least three of the wind turbines located only in the downwind-most row of the rows according to the predominant wind direction, the wind guides being ground-based, seabed-based or floating in the sea surface and with a horizontal length and a vertical height defining an area standing vertically within a range of +/−10 degrees;
  configuring each wind guide with:
  a horizontal length between two lateral ends thereof not lower than 1 time the length of a diameter of the rotor of the closest wind turbine;
  the vertical height being constant or variable along the horizontal length and not lower than 3 meters and not higher than two thirds of the height of a blade tip of the blades of the closest wind turbine rotor when positioned at its lowermost position;
  a horizontal width being constant or variable along the horizontal length and always lower than 1.5 times the vertical height of the wind guides;
  arranging and configuring each of the wind guides to block and thereby guide the wind at an altitude below the rotor swept area so the wind behind the wind guides has another direction and speed than the wind in front of the wind guides;
  arranging and configuring each of the wind guides to direct the wind to an area in front of and/or behind the wind turbine rotor swept areas so that the wind speed through the rotor swept areas is increased;
  configuring the wind guides so that the horizontal gap between the two closest ends of two adjacent wind guides is less than the sum of the lengths of the rotor diameters of the two wind turbines positioned closest to the two adjacent wind guides.

* * * * *